(12) United States Patent
Wood et al.

(10) Patent No.: US 10,928,510 B1
(45) Date of Patent: Feb. 23, 2021

(54) SYSTEM FOR AND METHOD OF IMAGE PROCESSING FOR LOW VISIBILITY LANDING APPLICATIONS

(71) Applicant: Rockwell Collins, Inc., Cedar Rapids, IA (US)

(72) Inventors: Robert B. Wood, Beaverton, OR (US); Carlo L. Tiana, Portland, OR (US); Jeffery A. Finley, Cedar Rapids, IA (US); Gregg A. Walt, Newberg, OR (US); Irina R. Sandu, Lake Oswego, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 574 days.

(21) Appl. No.: 15/627,268

(22) Filed: Jun. 19, 2017

Related U.S. Application Data

(63) Continuation-in-part of application No. 14/482,681, filed on Sep. 10, 2014, now Pat. No. 9,733,349.

(51) Int. Cl.
*G01S 13/91* (2006.01)
*G01S 13/95* (2006.01)
*G01S 13/86* (2006.01)
*G02B 27/01* (2006.01)

(52) U.S. Cl.
CPC ............ *G01S 13/913* (2013.01); *G01S 13/86* (2013.01); *G01S 13/953* (2013.01); *G02B 27/0101* (2013.01); *G02B 2027/014* (2013.01)

(58) Field of Classification Search
CPC ....... G01S 13/913; G01S 13/953; G01S 13/86
See application file for complete search history.

(56) References Cited

U.S. PATENT DOCUMENTS

| | | | |
|---|---|---|---|
| 2,416,155 | A | 2/1947 | Chubb |
| 2,849,184 | A | 8/1958 | Arden et al. |
| 2,929,059 | A | 3/1960 | Parker |
| 2,930,035 | A | 3/1960 | Altekruse |
| 2,948,892 | A | 8/1960 | White |
| 2,965,894 | A | 12/1960 | Sweeney |
| 2,994,966 | A | 8/1961 | Senitsky et al. |

(Continued)

FOREIGN PATENT DOCUMENTS

| | | |
|---|---|---|
| CN | 102269809 | 12/2011 |
| CN | 104898833 A | 9/2015 |

(Continued)

OTHER PUBLICATIONS

Notice of Allowance for U.S. Appl. No. 15/222,923 dated Feb. 2, 2019. 7 pages (Continued)

*Primary Examiner* — Marcus E Windrich
(74) *Attorney, Agent, or Firm* — Suiter Swantz pc llo

(57) ABSTRACT

An apparatus is for use with an aircraft radar system having a radar antenna. The apparatus includes processing electronics configured to cause the radar antenna to emit radar pulses having a pulse width less than 6 microseconds and configured to receive radar data associated with signals associated with the radar antenna. The radar data is processed to identify centroids associated with indications of the runway lights for a runway in the radar data. A best fit analysis of the centroids is used to identify a runway centerline associated with the runway.

20 Claims, 8 Drawing Sheets

(56) References Cited

U.S. PATENT DOCUMENTS

| | | | |
|---|---|---|---|
| 3,031,660 A | 4/1962 | Young | |
| 3,049,702 A | 8/1962 | Schreitmueller | |
| 3,064,252 A | 11/1962 | Varela | |
| 3,070,795 A | 12/1962 | Chambers | |
| 3,071,766 A | 1/1963 | Fenn | |
| 3,072,903 A | 1/1963 | Meyer | |
| 3,089,801 A | 5/1963 | Tierney et al. | |
| 3,107,351 A | 10/1963 | Milam | |
| 3,113,310 A | 12/1963 | Standing | |
| 3,129,425 A | 4/1964 | Sanner | |
| 3,153,234 A | 10/1964 | Begeman et al. | |
| 3,175,215 A | 3/1965 | Blasberg et al. | |
| 3,212,088 A | 10/1965 | Alexander et al. | |
| 3,221,328 A | 11/1965 | Walter | |
| 3,241,141 A | 3/1966 | Wall | |
| 3,274,593 A | 9/1966 | Varela et al. | |
| 3,325,807 A | 6/1967 | Burns et al. | |
| 3,334,344 A | 8/1967 | Colby, Jr. | |
| 3,339,199 A | 8/1967 | Pichafroy | |
| 3,373,423 A | 3/1968 | Levy | |
| 3,396,391 A | 8/1968 | Anderson | |
| 3,397,397 A | 8/1968 | Barney | |
| 3,448,450 A | 6/1969 | Alfandari et al. | |
| 3,618,090 A | 11/1971 | Garrison | |
| 3,680,094 A | 7/1972 | Bayle et al. | |
| 3,716,855 A | 2/1973 | Asam | |
| 3,739,380 A | 6/1973 | Burdic et al. | |
| 3,781,878 A | 12/1973 | Kirkpatrick | |
| 3,810,175 A | 5/1974 | Bell | |
| 3,815,132 A | 6/1974 | Case et al. | |
| 3,816,718 A | 6/1974 | Hall et al. | |
| 3,851,758 A | 12/1974 | Makhijani et al. | |
| 3,866,222 A | 2/1975 | Young | |
| 3,885,237 A | 5/1975 | Kirkpatrick | |
| 3,956,749 A | 5/1976 | Magorian | |
| 4,024,537 A | 5/1977 | Hart | |
| 4,058,701 A | 11/1977 | Gruber et al. | |
| 4,058,710 A | 11/1977 | Altmann | |
| 4,063,218 A | 12/1977 | Basov et al. | |
| 4,103,300 A | 7/1978 | Gendreu et al. | |
| 4,235,951 A | 11/1980 | Swarovski | |
| 4,277,845 A | 7/1981 | Smith et al. | |
| 4,405,986 A | 9/1983 | Gray | |
| 4,435,707 A | 3/1984 | Clark | |
| 4,481,519 A | 11/1984 | Margerum | |
| 4,509,048 A | 4/1985 | Jain | |
| 4,532,515 A | 7/1985 | Cantrell et al. | |
| 4,594,676 A | 6/1986 | Breiholz et al. | |
| 4,595,925 A | 6/1986 | Hansen | |
| 4,598,292 A | 7/1986 | Devino | |
| 4,628,318 A | 12/1986 | Alitz | |
| 4,646,244 A | 2/1987 | Bateman et al. | |
| 4,649,388 A | 3/1987 | Atlas | |
| 4,654,665 A | 3/1987 | Kiuchi et al. | |
| 4,685,149 A | 8/1987 | Smith et al. | |
| 4,723,124 A | 2/1988 | Boles | |
| 4,760,396 A | 7/1988 | Barney et al. | |
| 4,828,382 A | 5/1989 | Vermilion | |
| 4,843,398 A | 6/1989 | Houston et al. | |
| 4,912,477 A | 3/1990 | Lory et al. | |
| 4,914,436 A | 4/1990 | Bateman et al. | |
| 4,924,401 A | 5/1990 | Bice et al. | |
| 4,939,513 A | 7/1990 | Paterson et al. | |
| 4,951,059 A | 8/1990 | Taylor, Jr. | |
| 4,953,972 A | 9/1990 | Zuk | |
| 4,965,573 A | 10/1990 | Gallagher et al. | |
| 4,987,419 A | 1/1991 | Salkeld | |
| 5,045,855 A | 9/1991 | Moreira | |
| 5,047,779 A | 9/1991 | Hager | |
| 5,047,781 A | 9/1991 | Bleakney | |
| 5,049,886 A | 9/1991 | Seitz et al. | |
| 5,053,778 A | 10/1991 | Imhoff | |
| 5,166,688 A | 11/1992 | Moreira | |
| 5,173,703 A | 12/1992 | Mangiapane et al. | |
| 5,175,554 A | 12/1992 | Mangiapane et al. | |
| 5,198,819 A | 3/1993 | Susnjara | |
| 5,202,690 A | 4/1993 | Frederick | |
| 5,247,303 A | 9/1993 | Cornelius et al. | |
| 5,273,553 A | 12/1993 | Hoshi et al. | |
| 5,311,183 A | 5/1994 | Mathews et al. | |
| 5,329,391 A | 7/1994 | Miyamoto et al. | |
| 5,332,998 A | 7/1994 | Avignon et al. | |
| 5,345,241 A | 9/1994 | Huddle | |
| 5,365,356 A | 11/1994 | McFadden | |
| 5,383,457 A | 1/1995 | Cohen | |
| 5,442,364 A | 8/1995 | Lee et al. | |
| 5,530,440 A | 6/1996 | Danzer et al. | |
| 5,539,409 A | 7/1996 | Mathews et al. | |
| 5,559,515 A | 9/1996 | Alimena et al. | |
| 5,559,518 A | 9/1996 | Didomizio | |
| 5,566,840 A | 10/1996 | Waldner et al. | |
| 5,592,178 A | 1/1997 | Chang et al. | |
| 5,678,303 A | 10/1997 | Wichmann | |
| 5,736,957 A | 4/1998 | Raney | |
| 5,820,080 A | 10/1998 | Eschenbach | |
| 5,828,332 A | 10/1998 | Frederick | |
| 5,831,570 A * | 11/1998 | Ammar | F41G 7/2286 342/26 B |
| 5,839,080 A | 11/1998 | Muller et al. | |
| 5,867,119 A | 2/1999 | Corrubia et al. | |
| 5,894,286 A | 4/1999 | Morand et al. | |
| 5,918,517 A | 7/1999 | Malapert et al. | |
| 5,920,276 A | 7/1999 | Frederick | |
| 5,923,279 A | 7/1999 | Bamler et al. | |
| 5,936,575 A | 8/1999 | Azzarelli et al. | |
| 5,942,062 A | 8/1999 | Hassall et al. | |
| 5,945,926 A | 8/1999 | Ammar et al. | |
| 5,950,512 A | 9/1999 | Fields | |
| 5,959,762 A | 9/1999 | Bandettini et al. | |
| 5,978,715 A | 11/1999 | Briffe et al. | |
| 6,002,347 A | 12/1999 | Daly et al. | |
| 6,023,240 A | 2/2000 | Sutton | |
| 6,061,016 A | 5/2000 | Lupinski et al. | |
| 6,061,022 A | 5/2000 | Menegozzi et al. | |
| 6,064,942 A | 5/2000 | Johnson et al. | |
| 6,075,484 A | 6/2000 | Daniel et al. | |
| 6,092,009 A | 7/2000 | Glover | |
| 6,112,141 A | 8/2000 | Briffe et al. | |
| 6,112,570 A | 9/2000 | Hruschak | |
| 6,122,570 A | 9/2000 | Muller et al. | |
| 6,127,944 A | 10/2000 | Daly et al. | |
| 6,128,066 A | 10/2000 | Yokozeki | |
| 6,128,553 A | 10/2000 | Gordon et al. | |
| 6,138,060 A | 10/2000 | Conner et al. | |
| 6,150,901 A | 11/2000 | Auken | |
| 6,154,151 A | 11/2000 | McElreath et al. | |
| 6,154,169 A | 11/2000 | Kuntman | |
| 6,157,339 A | 12/2000 | Sato et al. | |
| 6,157,891 A | 12/2000 | Lin | |
| 6,163,021 A | 12/2000 | Mickelson | |
| 6,166,661 A | 12/2000 | Anderson et al. | |
| 6,169,770 B1 | 1/2001 | Henely | |
| 6,178,391 B1 | 1/2001 | Anderson et al. | |
| 6,184,816 B1 | 2/2001 | Zheng et al. | |
| 6,188,330 B1 | 2/2001 | Glover | |
| 6,194,980 B1 | 2/2001 | Thon | |
| 6,199,008 B1 | 3/2001 | Aratow et al. | |
| 6,201,494 B1 | 3/2001 | Kronfeld | |
| 6,204,806 B1 | 3/2001 | Hoech | |
| 6,205,400 B1 | 3/2001 | Lin | |
| 6,208,284 B1 | 3/2001 | Woodell et al. | |
| 6,219,592 B1 | 4/2001 | Muller et al. | |
| 6,233,522 B1 | 5/2001 | Morici | |
| 6,236,351 B1 | 5/2001 | Conner et al. | |
| 6,259,400 B1 | 7/2001 | Higgins et al. | |
| 6,266,114 B1 | 7/2001 | Skarohlid | |
| 6,278,799 B1 | 8/2001 | Hoffman | |
| 6,281,832 B1 | 8/2001 | McElreath | |
| 6,285,298 B1 | 9/2001 | Gordon | |
| 6,285,337 B1 | 9/2001 | West et al. | |
| 6,285,926 B1 | 9/2001 | Weiler et al. | |
| 6,289,277 B1 | 9/2001 | Feyereisen et al. | |
| 6,311,108 B1 | 10/2001 | Ammar et al. | |
| 6,317,468 B1 | 11/2001 | Meyer | |

(56) References Cited

U.S. PATENT DOCUMENTS

| | | | |
|---|---|---|---|
| 6,317,690 B1 | 11/2001 | Gia | |
| 6,317,872 B1 | 11/2001 | Gee et al. | |
| 6,340,946 B1 | 1/2002 | Wolfson et al. | |
| 6,345,127 B1 | 2/2002 | Mitchell | |
| 6,359,585 B1 | 3/2002 | Bechman et al. | |
| 6,366,013 B1 | 4/2002 | Leenders et al. | |
| 6,373,418 B1 | 4/2002 | Abbey | |
| 6,374,286 B1 | 4/2002 | Gee et al. | |
| 6,377,202 B1 | 4/2002 | Kropfli et al. | |
| 6,377,892 B1 | 4/2002 | Johnson et al. | |
| 6,388,607 B1 | 5/2002 | Woodell | |
| 6,388,608 B1 | 5/2002 | Woodell et al. | |
| 6,388,724 B1 | 5/2002 | Campbell et al. | |
| 6,389,354 B1 | 5/2002 | Hicks et al. | |
| 6,401,038 B2 | 6/2002 | Gia | |
| 6,411,890 B1 | 6/2002 | Zimmerman | |
| 6,421,000 B1 | 7/2002 | McDowell | |
| 6,421,603 B1 | 7/2002 | Pratt et al. | |
| 6,424,288 B1 | 7/2002 | Woodell | |
| 6,426,717 B1 | 7/2002 | Maloratsky | |
| 6,426,720 B1 | 7/2002 | Ross et al. | |
| 6,427,122 B1 | 7/2002 | Lin | |
| 6,441,773 B1 | 8/2002 | Kelly et al. | |
| 6,445,310 B1 | 9/2002 | Bateman et al. | |
| 6,448,922 B1 | 9/2002 | Kelly | |
| 6,452,511 B1 | 9/2002 | Kelly et al. | |
| 6,456,236 B1 | 9/2002 | Hauck et al. | |
| 6,456,238 B1 | 9/2002 | Posey | |
| 6,462,703 B2 | 10/2002 | Hedrick | |
| 6,473,026 B1 | 10/2002 | Ali-Mehenni et al. | |
| 6,473,037 B2 | 10/2002 | Vail et al. | |
| 6,473,240 B1 | 10/2002 | Dehmlow | |
| 6,481,482 B1 | 11/2002 | Shimotomai | |
| 6,492,934 B1 | 12/2002 | Hwang et al. | |
| 6,501,424 B1 | 12/2002 | Haendel et al. | |
| 6,512,476 B1 | 1/2003 | Woodell | |
| 6,512,527 B1 | 1/2003 | Barber et al. | |
| 6,516,272 B2 | 2/2003 | Lin | |
| 6,516,283 B2 | 2/2003 | McCall et al. | |
| 6,520,056 B1 | 2/2003 | Nemeth et al. | |
| 6,525,674 B1 | 2/2003 | Kelly et al. | |
| 6,531,669 B1 | 3/2003 | Miller et al. | |
| 6,549,161 B1 | 4/2003 | Woodell | |
| 6,567,728 B1 | 5/2003 | Kelly et al. | |
| 6,574,030 B1 | 6/2003 | Mosier | |
| 6,577,947 B1 | 6/2003 | Kronfeld et al. | |
| 6,590,528 B1 | 7/2003 | Dewulf | |
| 6,591,171 B1 | 7/2003 | Ammar et al. | |
| 6,593,875 B2 | 7/2003 | Bergin et al. | |
| 6,600,443 B2 | 7/2003 | Landt | |
| 6,603,425 B1 | 8/2003 | Woodell | |
| 6,614,057 B2 | 9/2003 | Silvernail et al. | |
| 6,650,275 B1 | 11/2003 | Kelly et al. | |
| 6,650,291 B1 | 11/2003 | West et al. | |
| 6,653,947 B2 | 11/2003 | Dwyer et al. | |
| 6,667,710 B2 | 12/2003 | Cornell et al. | |
| 6,681,668 B1 | 1/2004 | Smirle | |
| 6,690,298 B1 | 2/2004 | Barber et al. | |
| 6,690,299 B1 | 2/2004 | Suiter | |
| 6,690,317 B2 | 2/2004 | Szeto et al. | |
| 6,697,008 B1 | 2/2004 | Sternowski | |
| 6,697,012 B2 | 2/2004 | Lodwig et al. | |
| 6,710,663 B1 | 3/2004 | Berquist | |
| 6,714,186 B1 | 3/2004 | Mosier et al. | |
| 6,720,890 B1 | 4/2004 | Ezroni et al. | |
| 6,724,344 B1 | 4/2004 | Stockmaster et al. | |
| 6,731,236 B1 | 5/2004 | Hager et al. | |
| 6,738,011 B1 | 5/2004 | Evans | |
| 6,739,929 B2 | 5/2004 | Furukawa et al. | |
| 6,741,203 B1 | 5/2004 | Woodell | |
| 6,741,208 B1 | 5/2004 | West et al. | |
| 6,744,382 B1 | 6/2004 | Lapis et al. | |
| 6,744,408 B1 | 6/2004 | Stockmaster | |
| 6,757,624 B1 | 6/2004 | Hwang et al. | |
| 6,760,155 B2 | 7/2004 | Murayama et al. | |
| 6,771,626 B1 | 8/2004 | Golubiewski et al. | |
| 6,782,392 B1 | 8/2004 | Weinberger et al. | |
| 6,799,095 B1 | 9/2004 | Owen et al. | |
| 6,803,245 B2 | 10/2004 | Auch et al. | |
| 6,804,614 B1 | 10/2004 | McGraw et al. | |
| 6,806,846 B1 | 10/2004 | West | |
| 6,807,538 B1 | 10/2004 | Weinberger et al. | |
| 6,813,777 B1 | 11/2004 | Weinberger et al. | |
| 6,819,983 B1 | 11/2004 | McGraw | |
| 6,822,617 B1 | 11/2004 | Mather et al. | |
| 6,825,804 B1 | 11/2004 | Doty | |
| 6,832,538 B1 | 12/2004 | Hwang | |
| 6,839,017 B1 | 1/2005 | Dillman | |
| 6,842,288 B1 | 1/2005 | Liu et al. | |
| 6,850,185 B1 * | 2/2005 | Woodell | G01S 13/93 342/29 |
| 6,862,323 B1 | 3/2005 | Loper | |
| 6,862,501 B2 | 3/2005 | He | |
| 6,865,452 B2 | 3/2005 | Burdon | |
| 6,879,280 B1 | 4/2005 | Bull et al. | |
| 6,879,886 B1 | 4/2005 | Wilkins et al. | |
| 6,882,302 B1 | 4/2005 | Woodell et al. | |
| 6,908,202 B2 | 6/2005 | Graf et al. | |
| 6,917,396 B2 | 7/2005 | Hiraishi et al. | |
| 6,918,134 B1 | 7/2005 | Sherlock et al. | |
| 6,933,885 B1 | 8/2005 | Stockmaster et al. | |
| 6,938,258 B1 | 8/2005 | Weinberger et al. | |
| 6,950,062 B1 | 9/2005 | Mather et al. | |
| 6,959,057 B1 | 10/2005 | Tuohino | |
| 6,972,727 B1 | 12/2005 | West et al. | |
| 6,977,608 B1 | 12/2005 | Anderson et al. | |
| 6,984,545 B2 | 1/2006 | Grigg et al. | |
| 6,990,022 B2 | 1/2006 | Morikawa et al. | |
| 6,992,614 B1 | 1/2006 | Joyce | |
| 6,995,726 B1 | 2/2006 | West et al. | |
| 6,998,648 B2 | 2/2006 | Silvernail | |
| 6,998,908 B1 | 2/2006 | Sternowski | |
| 6,999,022 B1 | 2/2006 | Vesel et al. | |
| 6,999,027 B1 | 2/2006 | Stockmaster | |
| 7,002,546 B1 | 2/2006 | Stuppi et al. | |
| 7,010,398 B2 | 3/2006 | Wilkins et al. | |
| 7,023,375 B2 | 4/2006 | Klausing et al. | |
| 7,026,956 B1 | 4/2006 | Wenger et al. | |
| 7,028,304 B1 | 4/2006 | Weinberger et al. | |
| 7,030,945 B2 | 4/2006 | Umemoto et al. | |
| 7,034,753 B1 | 4/2006 | Elsallal et al. | |
| 7,042,387 B2 | 5/2006 | Ridenour et al. | |
| 7,053,796 B1 | 5/2006 | Barber | |
| 7,057,549 B2 | 6/2006 | Block | |
| 7,064,680 B2 | 6/2006 | Reynolds et al. | |
| 7,069,120 B1 | 6/2006 | Koenck et al. | |
| 7,089,092 B1 | 8/2006 | Wood et al. | |
| 7,092,645 B1 | 8/2006 | Sternowski | |
| 7,098,913 B1 | 8/2006 | Etherington et al. | |
| 7,109,912 B1 | 9/2006 | Paramore et al. | |
| 7,109,913 B1 | 9/2006 | Paramore et al. | |
| 7,123,260 B2 | 10/2006 | Brust | |
| 7,129,885 B1 | 10/2006 | Woodell et al. | |
| 7,145,501 B1 | 12/2006 | Manfred et al. | |
| 7,148,816 B1 | 12/2006 | Carrico | |
| 7,151,507 B1 | 12/2006 | Herting | |
| 7,158,072 B1 | 1/2007 | Venkatachalam et al. | |
| 7,161,525 B1 | 1/2007 | Finley et al. | |
| 7,170,446 B1 | 1/2007 | West et al. | |
| 7,170,959 B1 | 1/2007 | Abbey | |
| 7,180,476 B1 | 2/2007 | Guell et al. | |
| 7,191,406 B1 | 3/2007 | Barber et al. | |
| 7,196,329 B1 | 3/2007 | Wood et al. | |
| 7,205,933 B1 | 4/2007 | Snodgrass | |
| 7,209,070 B2 | 4/2007 | Gilliland et al. | |
| 7,212,216 B2 | 5/2007 | He et al. | |
| 7,218,268 B2 | 5/2007 | Vandenberg | |
| 7,219,011 B1 | 5/2007 | Barber | |
| 7,242,343 B1 | 7/2007 | Woodell | |
| 7,242,345 B2 | 7/2007 | Raestad et al. | |
| 7,250,903 B1 | 7/2007 | McDowell | |
| 7,265,710 B2 | 9/2007 | Deagro | |
| 7,269,657 B1 | 9/2007 | Alexander et al. | |
| 7,272,472 B1 | 9/2007 | McElreath | |

(56) References Cited

U.S. PATENT DOCUMENTS

| | | | |
|---|---|---|---|
| 7,273,403 B2 | 9/2007 | Yokota et al. |
| 7,280,068 B2 | 10/2007 | Lee et al. |
| 7,289,058 B2 | 10/2007 | Shima |
| 7,292,178 B1 | 11/2007 | Woodell et al. |
| 7,292,180 B2 | 11/2007 | Schober |
| 7,295,150 B2 | 11/2007 | Burlet et al. |
| 7,295,901 B1 | 11/2007 | Little et al. |
| 7,301,496 B2 | 11/2007 | Honda et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,312,725 B2 | 12/2007 | Berson et al. |
| 7,312,743 B2 | 12/2007 | Ridenour et al. |
| 7,317,427 B2 | 1/2008 | Pauplis et al. |
| 7,321,332 B2 | 1/2008 | Focke et al. |
| 7,337,043 B2 | 2/2008 | Bull |
| 7,349,154 B2 | 3/2008 | Aiura et al. |
| 7,352,292 B2 | 4/2008 | Alter et al. |
| 7,361,240 B2 | 4/2008 | Kim |
| 7,372,394 B1 | 5/2008 | Woodell et al. |
| 7,373,223 B2 | 5/2008 | Murphy |
| 7,375,678 B2 | 5/2008 | Feyereisen et al. |
| 7,379,014 B1 | 5/2008 | Woodell et al. |
| 7,379,796 B2 | 5/2008 | Walsdorf et al. |
| 7,381,110 B1 | 6/2008 | Sampica et al. |
| 7,417,578 B1 | 8/2008 | Woodell et al. |
| 7,417,579 B1 | 8/2008 | Woodell |
| 7,423,578 B1 | 9/2008 | Tietjen |
| 7,446,697 B2 | 11/2008 | Burlet et al. |
| 7,446,938 B2 | 11/2008 | Miyatake et al. |
| 7,452,258 B1 | 11/2008 | Marzen et al. |
| 7,474,262 B2 | 1/2009 | Alland |
| 7,479,920 B2 | 1/2009 | Niv |
| 7,486,220 B1 | 2/2009 | Kronfeld et al. |
| 7,486,291 B2 | 2/2009 | Berson et al. |
| 7,492,304 B1 | 2/2009 | Woodell et al. |
| 7,492,305 B1 | 2/2009 | Woodell et al. |
| 7,515,069 B2 | 4/2009 | Dorneich et al. |
| 7,515,087 B1 | 4/2009 | Woodell et al. |
| 7,515,088 B1 | 4/2009 | Woodell et al. |
| 7,525,448 B1 | 4/2009 | Wilson et al. |
| 7,528,765 B1 | 5/2009 | Woodell et al. |
| 7,528,915 B2 | 5/2009 | Choi et al. |
| 7,541,970 B1 | 6/2009 | Godfrey et al. |
| 7,541,971 B1 | 6/2009 | Woodell et al. |
| 7,551,451 B2 | 6/2009 | Kim et al. |
| 7,557,735 B1 | 7/2009 | Woodell et al. |
| 7,566,254 B2 | 7/2009 | Sampica et al. |
| 7,570,177 B2 | 8/2009 | Reynolds et al. |
| 7,576,680 B1 | 8/2009 | Woodell |
| 7,579,978 B1 * | 8/2009 | Finley | G01S 7/412 342/33 |
| 7,603,209 B2 | 10/2009 | Dwyer et al. |
| 7,609,200 B1 | 10/2009 | Woodell et al. |
| 7,612,706 B2 | 11/2009 | Honda et al. |
| 7,616,150 B1 | 11/2009 | Woodell |
| 7,633,428 B1 | 12/2009 | McCusker et al. |
| 7,633,430 B1 | 12/2009 | Wichgers et al. |
| 7,633,584 B2 | 12/2009 | Umemoto et al. |
| 7,639,175 B1 | 12/2009 | Woodell |
| 7,664,601 B2 | 2/2010 | Daly, Jr. |
| 7,675,461 B1 | 3/2010 | McCusker et al. |
| 7,693,621 B1 | 4/2010 | Chamas |
| 7,696,921 B1 | 4/2010 | Finley et al. |
| 7,714,767 B1 | 5/2010 | Kronfeld et al. |
| 7,733,264 B1 | 6/2010 | Woodell et al. |
| 7,783,427 B1 | 8/2010 | Woodell et al. |
| 7,783,429 B2 | 8/2010 | Walden et al. |
| 7,791,529 B2 | 9/2010 | Filias et al. |
| 7,808,422 B1 | 10/2010 | Woodell et al. |
| 7,814,676 B2 | 10/2010 | Sampica et al. |
| 7,843,380 B1 | 11/2010 | Woodell |
| 7,859,448 B1 | 12/2010 | Woodell et al. |
| 7,859,449 B1 | 12/2010 | Woodell et al. |
| 7,864,103 B2 | 1/2011 | Weber et al. |
| 7,868,811 B1 | 1/2011 | Woodell et al. |
| 7,872,594 B1 | 1/2011 | Vesel |
| 7,889,117 B1 | 2/2011 | Woodell et al. |
| 7,889,118 B1 | 2/2011 | Finley et al. |
| 7,925,117 B2 * | 4/2011 | Hamza | G06T 7/33 382/294 |
| 7,927,440 B2 | 4/2011 | Matsuhira |
| 7,929,086 B2 | 4/2011 | Toyama et al. |
| 7,965,223 B1 * | 6/2011 | McCusker | G08G 5/0078 342/29 |
| 7,965,225 B1 | 6/2011 | Dickerson et al. |
| 8,035,547 B1 | 10/2011 | Flanigan et al. |
| 8,038,498 B2 | 10/2011 | Miyauchi et al. |
| 8,045,098 B2 | 10/2011 | Kitagawa et al. |
| 8,059,025 B2 | 11/2011 | D'Addio |
| 8,068,984 B2 | 11/2011 | Smith et al. |
| 8,072,368 B1 | 12/2011 | Woodell |
| 8,077,078 B1 | 12/2011 | Woodell et al. |
| 8,077,081 B2 | 12/2011 | Bateman et al. |
| 8,102,487 B2 | 1/2012 | Kitagawa et al. |
| 8,118,075 B2 | 2/2012 | Sampica et al. |
| 8,137,498 B2 | 3/2012 | Sampica et al. |
| 8,140,223 B2 | 3/2012 | Whitehead et al. |
| 8,159,464 B1 | 4/2012 | Gribble et al. |
| 8,232,917 B2 | 7/2012 | Scherzinger et al. |
| 8,289,202 B1 | 10/2012 | Christianson |
| 8,296,065 B2 | 10/2012 | Haynie et al. |
| 8,330,650 B2 | 12/2012 | Goldman |
| 8,373,580 B2 | 2/2013 | Bunch et al. |
| 8,410,975 B1 | 4/2013 | Bell et al. |
| 8,477,062 B1 | 7/2013 | Kanellis |
| 8,486,535 B1 | 7/2013 | Nemeth et al. |
| 8,493,241 B2 | 7/2013 | He |
| 8,515,600 B1 | 8/2013 | McCusker |
| 8,540,002 B2 | 9/2013 | Sampica et al. |
| 8,558,731 B1 | 10/2013 | Woodell |
| 8,576,112 B2 | 11/2013 | Garrec et al. |
| 8,583,315 B2 | 11/2013 | Whitehead et al. |
| 8,594,879 B2 | 11/2013 | Roberge et al. |
| 8,603,288 B2 | 12/2013 | Sampica et al. |
| 8,634,993 B2 | 1/2014 | McClure et al. |
| 8,639,416 B2 | 1/2014 | Jones et al. |
| 8,643,533 B1 | 2/2014 | Woodell et al. |
| 8,691,043 B2 | 4/2014 | Sampica et al. |
| 8,717,226 B2 | 5/2014 | Bon et al. |
| 8,755,954 B1 | 6/2014 | McCusker et al. |
| 8,773,301 B1 | 7/2014 | Woodell |
| 8,847,794 B2 | 9/2014 | Buratto et al. |
| 8,896,480 B1 | 11/2014 | Wilson et al. |
| 8,909,471 B1 | 12/2014 | Jinkins et al. |
| 8,917,191 B1 | 12/2014 | Tiana et al. |
| 8,936,057 B2 | 1/2015 | Sampica et al. |
| 8,976,042 B1 * | 3/2015 | Chiew | G06T 15/405 340/945 |
| 8,977,491 B1 | 3/2015 | McCusker et al. |
| 9,024,805 B1 | 5/2015 | Jinkins et al. |
| 9,174,746 B1 * | 11/2015 | Bell | B64D 45/04 |
| 9,354,633 B1 | 5/2016 | McCusker et al. |
| 2001/0023390 A1 | 9/2001 | Gia |
| 2001/0050372 A1 | 12/2001 | Krijn et al. |
| 2001/0053648 A1 | 12/2001 | Furukawa et al. |
| 2002/0039070 A1 | 4/2002 | Ververs et al. |
| 2002/0111717 A1 | 8/2002 | Scherzinger et al. |
| 2002/0116125 A1 | 8/2002 | Lin |
| 2002/0116126 A1 | 8/2002 | Lin |
| 2002/0158256 A1 | 10/2002 | Yamada et al. |
| 2002/0179229 A1 | 12/2002 | Chuzles |
| 2002/0185600 A1 | 12/2002 | Kerr |
| 2002/0187284 A1 | 12/2002 | Kinoshita et al. |
| 2003/0021491 A1 | 1/2003 | Brust |
| 2003/0038916 A1 | 2/2003 | Nakano et al. |
| 2003/0043315 A1 | 3/2003 | Umemoto et al. |
| 2003/0071828 A1 | 4/2003 | Wilkins et al. |
| 2003/0089214 A1 | 5/2003 | Fukuta et al. |
| 2003/0093187 A1 | 5/2003 | Walker |
| 2003/0102999 A1 | 6/2003 | Bergin et al. |
| 2003/0156238 A1 | 8/2003 | Hiraishi et al. |
| 2003/0160718 A1 | 8/2003 | Nagasaku |
| 2003/0174396 A1 | 9/2003 | Murayama et al. |

(56) References Cited

U.S. PATENT DOCUMENTS

| | | |
|---|---|---|
| 2003/0180528 A1 | 9/2003 | Flosenzier et al. |
| 2003/0189606 A1 | 10/2003 | Moon et al. |
| 2003/0195672 A1 | 10/2003 | He |
| 2003/0216859 A1 | 11/2003 | Martell et al. |
| 2003/0222887 A1 | 12/2003 | Wilkins et al. |
| 2004/0044445 A1 | 3/2004 | Burdon |
| 2004/0059473 A1 | 3/2004 | He |
| 2004/0066645 A1 | 4/2004 | Graf et al. |
| 2004/0072575 A1 | 4/2004 | Young et al. |
| 2004/0083038 A1 | 4/2004 | He |
| 2004/0130073 A1 | 7/2004 | Yamazaki et al. |
| 2004/0145499 A1 | 7/2004 | Schmidt et al. |
| 2004/0160341 A1 | 8/2004 | Feyereisen et al. |
| 2004/0160364 A1 | 8/2004 | Regev |
| 2004/0181318 A1 | 9/2004 | Redmond et al. |
| 2004/0264549 A1 | 12/2004 | Hoole |
| 2005/0004748 A1 | 1/2005 | Pinto et al. |
| 2005/0052451 A1 | 3/2005 | Servantie |
| 2005/0073455 A1 | 4/2005 | Chow et al. |
| 2005/0126679 A1 | 6/2005 | Kim |
| 2005/0136625 A1 | 6/2005 | Henseler et al. |
| 2005/0150289 A1 | 7/2005 | Osborne |
| 2005/0174350 A1 | 8/2005 | Ridenour et al. |
| 2005/0200502 A1 | 9/2005 | Reusser et al. |
| 2005/0225461 A1 | 10/2005 | Tsai et al. |
| 2005/0225481 A1 | 10/2005 | Bonthron |
| 2005/0230563 A1 | 10/2005 | Corcoran, III |
| 2006/0004497 A1 | 1/2006 | Bull |
| 2006/0097895 A1 | 5/2006 | Reynolds et al. |
| 2006/0098452 A1 | 5/2006 | Choi et al. |
| 2006/0164284 A1 | 7/2006 | Pauplis et al. |
| 2006/0207967 A1 | 9/2006 | Bocko et al. |
| 2006/0215265 A1 | 9/2006 | Miyatake et al. |
| 2006/0227012 A1 | 10/2006 | He |
| 2006/0244636 A1 | 11/2006 | Rye et al. |
| 2006/0245171 A1 | 11/2006 | Kim et al. |
| 2006/0290253 A1 | 12/2006 | Yeo et al. |
| 2006/0290531 A1 | 12/2006 | Reynolds et al. |
| 2007/0001897 A1 | 1/2007 | Alland |
| 2007/0002078 A1 | 1/2007 | He et al. |
| 2007/0008214 A1 | 1/2007 | Wasiewicz |
| 2007/0013575 A1 | 1/2007 | Lee et al. |
| 2007/0018887 A1 | 1/2007 | Feyereisen et al. |
| 2007/0032951 A1 | 2/2007 | Tanenhaus et al. |
| 2007/0060063 A1 | 3/2007 | Wright et al. |
| 2007/0146364 A1 | 6/2007 | Aspen |
| 2007/0171094 A1 | 7/2007 | Alter et al. |
| 2007/0176794 A1 | 8/2007 | Feyereisen et al. |
| 2007/0179684 A1 | 8/2007 | He |
| 2007/0228586 A1 | 10/2007 | Merrill et al. |
| 2007/0247350 A1 | 10/2007 | Ryan |
| 2007/0279253 A1 | 12/2007 | Priest |
| 2007/0297736 A1 | 12/2007 | Sherman et al. |
| 2008/0018524 A1 | 1/2008 | Christianson |
| 2008/0051947 A1 | 2/2008 | Kemp |
| 2008/0065286 A1* | 3/2008 | Han ............... G01S 19/48 |
| | | 701/28 |
| 2008/0074308 A1 | 3/2008 | Becker et al. |
| 2008/0111731 A1 | 5/2008 | Hubbard et al. |
| 2008/0145610 A1 | 6/2008 | Muller et al. |
| 2008/0180351 A1 | 7/2008 | He |
| 2008/0305721 A1 | 12/2008 | Ohashi et al. |
| 2009/0021397 A1 | 1/2009 | Wipf et al. |
| 2009/0040070 A1 | 2/2009 | Alter et al. |
| 2009/0040772 A1 | 2/2009 | Laney |
| 2009/0046229 A1 | 2/2009 | Umemoto et al. |
| 2009/0126872 A1 | 5/2009 | Sampica et al. |
| 2009/0148682 A1 | 6/2009 | Higuchi |
| 2009/0152391 A1 | 6/2009 | McWhirk |
| 2009/0153783 A1 | 6/2009 | Umemoto |
| 2009/0164067 A1 | 6/2009 | Whitehead et al. |
| 2009/0207048 A1 | 8/2009 | He et al. |
| 2009/0219189 A1* | 9/2009 | Bateman ............... G01S 13/937 |
| | | 342/30 |
| 2009/0279030 A1 | 11/2009 | Toyama et al. |
| 2009/0279175 A1 | 11/2009 | Laney et al. |
| 2009/0324009 A1* | 12/2009 | Schulz ............... G06T 7/73 |
| | | 382/103 |
| 2010/0033499 A1 | 2/2010 | Gannon et al. |
| 2010/0103353 A1 | 4/2010 | Yamada |
| 2010/0297406 A1 | 11/2010 | Schaffer et al. |
| 2010/0312428 A1 | 12/2010 | Roberge et al. |
| 2010/0312461 A1 | 12/2010 | Haynie et al. |
| 2011/0037616 A1 | 2/2011 | Leutelt et al. |
| 2011/0054729 A1 | 3/2011 | Whitehead et al. |
| 2011/0075070 A1 | 3/2011 | Kitagawa et al. |
| 2011/0141405 A1 | 6/2011 | Kitagawa et al. |
| 2011/0165361 A1 | 7/2011 | Sherman et al. |
| 2011/0184594 A1 | 7/2011 | Manfred et al. |
| 2011/0273325 A1 | 11/2011 | Goldman |
| 2011/0282580 A1 | 11/2011 | Mohan |
| 2011/0304479 A1 | 12/2011 | Chen et al. |
| 2012/0053831 A1 | 3/2012 | Halder |
| 2012/0133546 A1 | 5/2012 | Reiter |
| 2012/0150426 A1 | 6/2012 | Conway |
| 2012/0174445 A1 | 7/2012 | Jones et al. |
| 2012/0176497 A1 | 7/2012 | Shadmi |
| 2012/0215410 A1 | 8/2012 | McClure et al. |
| 2013/0041529 A1 | 2/2013 | He et al. |
| 2013/0188049 A1* | 7/2013 | Koukol ............... G08G 5/025 |
| | | 348/144 |
| 2013/0234884 A1 | 9/2013 | Bunch et al. |
| 2013/0285847 A1 | 10/2013 | Ward |
| 2014/0009324 A1 | 1/2014 | Ranney et al. |
| 2015/0211883 A1 | 7/2015 | He |
| 2016/0131739 A1 | 5/2016 | Jinkins et al. |

FOREIGN PATENT DOCUMENTS

| | | |
|---|---|---|
| DE | 19649838 | 4/1998 |
| DE | 19949737 A1 | 4/2001 |
| EP | 0 556 351 B1 | 6/1995 |
| EP | 0 962 752 A1 | 12/1999 |
| EP | 1 092 821 A | 4/2001 |
| GB | 0 814 744 A | 6/1959 |
| GB | 1 092 821 A | 11/1967 |
| JP | 01-210328 | 8/1989 |
| JP | 05-200880 | 8/1993 |
| JP | 05-293895 | 11/1993 |
| JP | 06-051484 | 2/1994 |
| JP | H08-220547 A | 8/1996 |
| JP | 09-057779 | 3/1997 |
| JP | 10-156853 | 6/1998 |
| JP | 10-244589 | 9/1998 |
| JP | 2000-141388 | 5/2000 |
| JP | 2004-233590 | 8/2004 |
| JP | 2004-354645 | 12/2004 |
| JP | 2006-218658 | 8/2006 |
| JP | 2006-334912 | 12/2006 |
| JP | 2006-348208 | 12/2006 |
| JP | 2007-206559 | 8/2007 |
| JP | 2007-302398 A | 11/2007 |
| JP | 2008-238607 | 1/2008 |
| WO | WO-93/05634 | 3/1993 |
| WO | WO-2009/133102 A1 | 11/2009 |
| WO | WO-2011/089474 A2 | 7/2011 |

OTHER PUBLICATIONS

Corrected Notice of Allowability on U.S. Appl. No. 13/250,798, dated Jan. 12, 2017, 2 pages.
Non-Final Office Action for U.S. Appl. No. 15/166,191 dated Apr. 16, 2018. 13 pages.
Non-Final Office Action for U.S. Appl. No. 15/222,923 dated Aug. 31, 2018. 11 pages.
U.S. Appl. No. 11/851,323, filed Sep. 6, 2007, McCusker.
U.S. Appl. No. 11/863,219, filed Sep. 27, 2007, Woodell.
U.S. Appl. No. 11/863,221, filed Sep. 27, 2007, Woodell.
U.S. Appl. No. 11/899,801, filed Sep. 6, 2007, Woodell et al.
U.S. Appl. No. 11/900,002, filed Sep. 6, 2007, Woodell et al.
U.S. Appl. No. 12/167,200, filed Jul. 2, 2008, Woodell et al.
U.S. Appl. No. 12/167,203, filed Jul. 2, 2008, Woodell.

(56) References Cited

OTHER PUBLICATIONS

U.S. Appl. No. 12/167,208, filed Jul. 2, 2008, Dickerson et al.
U.S. Appl. No. 12/180,293, filed Jul. 25, 2008, Woodell et al.
U.S. Appl. No. 14/841,558, filed Aug. 31, 2015, Rockwell Collins, Inc.
U.S. Appl. No. 15/222,923, filed Jul. 28, 2016, Rockwell Collins, Inc.
"MountainScope™ on a TabletPC," PCAvionics™, printed from website www.pcavionics.com on Aug. 28, 2007, 1 page.
"PCAvionics: Makers of MountainScope™, A New Dimension in Situational Awareness," PCAvionics™, printed from website www.pcavionics.com on Aug. 28, 2007, 1 page.
TAWS Class A and Class B, Terrain Awareness and Warning Systems, Universal® Avionics Systems Corporation, Sep. 2007, 6 pages.
"TAWS Terrain Awareness and Warning System," Universal® Avionics, printed from website www.uasc.com on Aug. 28, 2007, 2 pages.
Adams, Charlotte, "Synthetic Vision: Picturing the Future," Avionics magazine, Solutions for Global Airspace Electronics, Oct. 2006, cover and pp. 22-29.
Advisory Action for U.S. Appl. No. 12/009,472, dated Feb. 25, 2013, 3 pages.
Advisory Action for U.S. Appl. No. 13/538,957, dated Jun. 14, 2013, 6 pages.
Airports Authority of India, Chapter 7: Visual Aids for Navigation-Lights, available prior to Jan. 1, 2005, retrieved from the internet at: http://www.aai.aero/aai_employees/chapter_7.pdf on Sep. 26, 2014, 33 pages.
Blue Mountain Avionics' Products, printed from website www.bluemountainavionics.com on Aug. 28, 2007, 4 pages.
Brailovsky et al., REVS122: A Radar-Based Enhanced Vision System for Degraded Visual Environments, Proc. of SPIE vol. 9087 908708-1, retrieved from the internet at http://proceedings.spiedigitallibrary.org on Jun. 25, 2014, 13 pages.
Carter, S. P., D. D. Blankenship, M. E. Peters, D. A. Young, J. W. Holt, and D. L. Morse (2007), Radar-based subglacial lake classification in Antarctica, Geochem. Geophys. Geosyst., 8, 003016, doi:10.1029/2006GC001408, 20 pages.
English Translation of Japanese Notice of Reasons for Rejection in Japanese Application No. 2016-001165, dated Apr. 25, 2017, 1 page.
Federal Aviation Administration, Advisory Circular AC 90-106, "Enhanced Flight Vision Systems", initiated by AFS-400, dated Jun. 2, 2010, 55 pages.
Federal Aviation Administration, Aeronautical Information Manual (AIM) Basic Flight Information and ATC Procedures, dated Jul. 24, 2014, 2 pages.
Final Office Action on U.S. Appl. No. 13/250,798 dated Sep. 4, 2014, 22 pages.
Final Office Action on U.S. Appl. No. 13/867,556 dated Jul. 3, 2014, 11 pages.
Final Office Action on U.S. Appl. No. 14/536,330, dated Jan. 23, 2017, 14 pages.
Final Office Action on U.S. Appl. No. 13/250,307 dated Jun. 11, 2014, 8 pages.
Final Office Action on U.S. Appl. No. 12/236,464, dated Dec. 5, 2011, 15 pages.
Final Office Action on U.S. Appl. No. 13/250,798 dated Aug. 7, 2015, 21 pages.
First Office Action on Korean Patent Application No. 10-2016-7013740, dated Sep. 19, 2016, 7 pages.
First Office Action with English Translation of Chinese Application No. 201510005057.5, dated Apr. 25, 2017, 8 pages.
Fountain, J.R., Digital Terrain Systems, Airborne Navigation Systems Workshop (Digest No. 1997/169), IEE Colloquium, pp. 4/1-4/6, Feb. 21, 1997.
G2000, Garmin, printed from website https://buy.garmin.com/shop/shop.do?cID=153&pID=97668 on Jun. 28, 2011, 2 pages.
G3000, Garmin, printed from website https://buy.garmin.com/shop/shop.do?cID=153&pID=66916 on Jun. 28, 2011, 2 pages.
G5000, Garmin, printed from website https://buy.garmin.com/shop/shop.do?cID=153&pID=90821&ra=true on Apr. 20, 2011, 2 pages.
Honeywell, RDR-4B Forward looking windshear detection / weather radar system user's manual with radar operating guidelines, Rev. 6, Jul. 2003, 106 pages.
Johnson, A., et al., Vision Guided Landing of an Autonomous Helicopter in Hazardous Terrain, Robotics and Automation, 2005. ICRA 2005. Proceedings of the 2005 IEEE International Conference, pp. 3966-3971, Apr. 18-22, 2005.
Kuntman, D., Airborne system to address leading cause of injuries in non-fatal airline accidents, ICAO Journal, Mar. 2000, 4 pages.
McGray et al., Air Operators, Airlines, Manufacturers and Interested Industry Stakeholders & Aero Chart Forum-Utilizing EFVS technology and incorporating it into FAA NextGen, Federal Aviation Administration, Apr. 23 & 30, 2014, 34 pages.
Non-Final Office Action on U.S. Appl. No. 13/250,798 dated Feb. 26, 2016, 9 pages.
Non-Final Office Action on U.S. Appl. No. 13/250,798 dated Mar. 18, 2015, 21 pages.
Non-Final Office Action on U.S. Appl. No. 13/250,798, dated Sep. 9, 2016, 6 pages.
Non-Final Office Action on U.S. Appl. No. 14/270,587, dated May 8, 2017, 16 pages.
Non-Final Office Action on U.S. Appl. No. 14/301,199 dated Sep. 9, 2015, 18 pages.
Non-Final Office Action on U.S. Appl. No. 14/482,681, dated Dec. 20, 2016, 9 pages.
Non-Final Office Action on U.S. Appl. No. 14/536,330 dated Jul. 13, 2016, 12 pages.
Notice of Allowability on U.S. Appl. No. 12/263,282 dated Apr. 13, 2016, 2 pages.
Notice of Allowance for U.S. Appl. No. 11/863,215, dated Oct. 13, 2009, 8 pages.
Notice of Allowance for U.S. Appl. No. 11/863,219, dated Jun. 23, 2009, 7 pages.
Notice of Allowance for U.S. Appl. No. 11/863,221, dated Aug. 2, 2010, 9 pages.
Notice of Allowance for U.S. Appl. No. 11/899,801, dated Aug. 19, 2010, 5 pages.
Notice of Allowance for U.S. Appl. No. 11/900,002, dated Sep. 14, 2010, 5 pages.
Notice of Allowance for U.S. Appl. No. 12/009,372, dated Oct. 13, 2011, 8 pages.
Notice of Allowance for U.S. Appl. No. 12/009,373, dated Jun. 16, 2010, 4 pages.
Notice of Allowance for U.S. Appl. No. 12/009,472, dated Sep. 5, 2013, 8 pages.
Notice of Allowance for U.S. Appl. No. 12/167,200, dated Oct. 28, 2010, 5 pages.
Notice of Allowance for U.S. Appl. No. 12/167,203, dated Jun. 21, 2013, 7 pages.
Notice of Allowance for U.S. Appl. No. 12/167,208, dated Mar. 21, 2011, 8 pages.
Notice of Allowance for U.S. Appl. No. 12/180,293, dated Aug. 4, 2011, 8 pages.
Notice of Allowance for U.S. Appl. No. 12/786,169, dated Mar. 28, 2013, 6 pages.
Notice of Allowance for U.S. Appl. No. 13/538,957, dated Oct. 3, 2013, 13 pages.
Notice of Allowance on U.S. Appl. No. 12/263,282 dated Jan. 29, 2016, 8 pages.
Notice of Allowance on U.S. Appl. No. 13/241,051 dated Aug. 28, 2014, 9 pages.
Notice of Allowance on U.S. Appl. No. 13/247,742 dated Jul. 30, 2014, 9 pages.
Notice of Allowance on U.S. Appl. No. 13/250,798, dated Sep. 28, 2016, 10 pages.
Notice of Allowance on U.S. Appl. No. 14/301,199 dated Mar. 1, 2016, 11 pages.
Notice of Allowance on U.S. Appl. No. 14/482,681, dated Mar. 28, 2017, 5 pages.

(56) References Cited

OTHER PUBLICATIONS

Office Action for U.S. Appl. No. 11/851,323, dated Aug. 6, 2009, 23 pages.
Office Action for U.S. Appl. No. 11/851,323, dated Dec. 15, 2010, 13 pages.
Office Action for U.S. Appl. No. 11/851,323, dated Jul. 5, 2012, 23 pages.
Office Action for U.S. Appl. No. 11/863,215, dated May 27, 2009, 5 pages.
Office Action for U.S. Appl. No. 11/863,215, dated Nov. 12, 2008, 8 pages.
Office Action for U.S. Appl. No. 11/863,219, dated Dec. 12, 2008, 7 pages.
Office Action for U.S. Appl. No. 11/863,221, dated Dec. 18, 2009, 5 pages.
Office Action for U.S. Appl. No. 11/863,221, dated Dec. 8, 2008, 8 pages.
Office Action for U.S. Appl. No. 11/863,221, dated May 26, 2009, 5 pages.
Office Action for U.S. Appl. No. 12/009,372, dated Dec. 20, 2010, 10 pages.
Office Action for U.S. Appl. No. 12/009,372, dated Jun. 13, 2011, 9 pages.
Office Action for U.S. Appl. No. 12/009,373, dated Dec. 30, 2009, 14 pages.
Office Action for U.S. Appl. No. 12/009,472, dated Apr. 16, 2012, 16 pages.
Office Action for U.S. Appl. No. 12/009,472, dated Jan. 14, 2011, 14 pages.
Office Action for U.S. Appl. No. 12/009,472, dated Mar. 20, 2013, 15 pages.
Office Action for U.S. Appl. No. 12/009,472, dated Nov. 3, 2011, 15 pages.
Office Action for U.S. Appl. No. 12/009,472, dated Nov. 9, 2012, 15 pages.
Office Action for U.S. Appl. No. 12/167,200, dated Jul. 21, 2010, 6 pages.
Office Action for U.S. Appl. No. 12/167,203, dated Aug. 26, 2010, 9 pages.
Office Action for U.S. Appl. No. 12/167,203, dated Jul. 20, 2011, 6 pages.
Office Action for U.S. Appl. No. 12/167,203, dated Mar. 7, 2013, 5 pages.
Office Action for U.S. Appl. No. 12/167,203, dated Oct. 31, 2011, 5 pages.
Office Action for U.S. Appl. No. 12/167,203, dated Sep. 21, 2012, 6 pages.
Office Action for U.S. Appl. No. 12/167,208, dated Dec. 30, 2009, 10 pages.
Office Action for U.S. Appl. No. 12/167,208, dated Feb. 7, 2011, 8 pages.
Office Action for U.S. Appl. No. 12/167,208, dated Jun. 3, 2010, 11 pages.
Office Action for U.S. Appl. No. 12/167,208, dated Oct. 19, 2010, 8 pages.
Office Action for U.S. Appl. No. 12/180,293, dated Jan. 4, 2011, 5 pages.
Office Action for U.S. Appl. No. 12/180,293, dated Jul. 28, 2010, 8 pages.
Office Action for U.S. Appl. No. 12/263,282, dated Jan. 5, 2012, 10 pages.
Office Action for U.S. Appl. No. 12/786,169, dated Jan. 18, 2013, 14 pages.
Office Action for U.S. Appl. No. 12/892,563, dated Feb. 19, 2013, 12 pages.
Office Action for U.S. Appl. No. 12/976,871, dated Feb. 15, 2012, 8 pages.
Office Action for U.S. Appl. No. 12/976,871, dated Jul. 10, 2012, 4 pages.
Office Action for U.S. Appl. No. 12/976,871, dated May 6, 2013, 5 pages.
Office Action for U.S. Appl. No. 12/976,871, dated Nov. 21, 2012, 5 pages.
Office Action for U.S. Appl. No. 12/976,871, dated Oct. 9, 2013, 5 pages.
Office Action for U.S. Appl. No. 13/183,314, dated Aug. 14, 2013, 11 pages.
Office Action for U.S. Appl. No. 13/183,314, dated Mar. 28, 2013, 12 pages.
Office Action for U.S. Appl. No. 13/224,992, dated Feb. 28, 2013, 10 pages.
Office Action for U.S. Appl. No. 13/250,307, dated Nov. 5, 2013, 11 pages.
Office Action for U.S. Appl. No. 13/474,559, dated Aug. 28, 2013, 10 pages.
Office Action for U.S. Appl. No. 13/474,559, dated Dec. 28, 2012, 8 pages.
Office Action for U.S. Appl. No. 13/538,957, dated Apr. 4, 2013, 19 pages.
Office Action for U.S. Appl. No. 13/538,957, dated Oct. 5, 2012, 18 pages.
Office Action for U.S. Appl. No. 13/743,182, dated Apr. 8, 2013, 10 pages.
Office Action for U.S. Appl. No. 12/786,169, dated Jul. 20, 2012, 8 pages.
Office Action in Japanese Patent Application 2015-116688, dated Aug. 25, 2015, 4 pages.
Office Action in Japanese Patent Application 2015-116716, dated Aug. 25, 2015, 3 pages.
Office Action on U.S. Appl. No. 12/236,464, dated Jul. 12, 2013, 17 pages.
Office Action on U.S. Appl. No. 11/787,460, dated Mar. 19, 2010, 16 pages.
Office Action on U.S. Appl. No. 11/787,460, dated Sep. 16, 2009, 15 pages.
Office Action on U.S. Appl. No. 12/236,464, dated Feb. 11, 2014, 21 pages.
Office Action on U.S. Appl. No. 12/236,464, dated Jun. 22, 2011, 14 pages.
Office Action on U.S. Appl. No. 12/892,563, dated May 7, 2013, 6 pages.
Office Action on U.S. Appl. No. 12/892,563, dated Oct. 10, 2012, 12 pages.
Office Action on U.S. Appl. No. 13/241,051 dated Feb. 27, 2014, 21 pages.
Office Action on U.S. Appl. No. 13/247,742 dated Dec. 3, 2013, 11 pages.
Office Action on U.S. Appl. No. 13/250,798 dated Apr. 23, 2014, 15 pages.
Office Action on U.S. Appl. No. 13/627,788, dated Jul. 28, 2014, 10 pages.
Office Action on U.S. Appl. No. 13/867,556 dated Feb. 7, 2014, 11 pages.
Office Action U.S. Appl. No. 11/787,460, dated Aug. 31, 2010, 18 pages.
Office Action with English Translation received in Korean Patent Application 10-2010-7017278, dated Aug. 26, 2015, 5 pages.
Pictures of DELPHINS, printed from website www.tunnel-in-the-sky.tudelft.nl on Aug. 28, 2007, 4 pages.
REVS Product Information Sheet, Sierra Nevada Corporation, dated May 7, 2014, 2 pages.
SKOLNIK, Introduction to Radar Systems, McGraw Hill Book Company, 2001, 3 pages.
SKOLNIK, Radar Handbook (McGraw Hill Book Company), 1990, 23 pages.
Synthetic Vision System, en.wikipedia.org/wiki/Synthetic_vision_system, retrieved Feb. 28, 2013, 4 pages.
Technical Standard Order, TSO-C115b, Airborne Area Navigation Equipment Using Multi-Sensor Inputs, Department of Transportation, Federal Aviation Administration, Sep. 30, 1994, 11 pages.
U.S. Office Action on U.S. Appl. No. 11/900,002 dated Jun. 8, 2010, 7 pages.

(56) References Cited

OTHER PUBLICATIONS

U.S. Office Action on U.S. Appl. No. 13/247,742 dated Apr. 16, 2014, 15 pages.
U.S. Office Action on U.S. Appl. No. 14/536,330, dated Aug. 11, 2017.
Vadlamani, A., et al., Improving the detection capability of spatial failure modes using downward-looking sensors in terrain database integrity monitors, Digital Avionics Systems Conference, 2003. DASC-03. The 22nd, vol. 2, pp. 9C.5-91-12 vol. 2, Oct. 12-16, 2003.
Van Kasteren, Joost, "Tunnel-in-the-Sky, Synthetic vision simplifies the pilot's job and enhances safety," printed from website www.delftoutlook.tudelft.nl on Aug. 28, 2007, 13 pages.
Walker, GD-Itronix Dynavue Technology, The Ultimate Outdoor-Readable Touch-Screen Display, Rugged PC Review, 4 pages.
Wang et al., a Simple Based on DSP Antenna Controller of Weather Radar, 2001 CIE International Conference, 4 pages.
Notice of Allowance for U.S. Appl. No. 14/482,681 dated May 1, 2017. 2 pages.
Notice of Allowance for U.S. Appl. No. 14/536,330, dated Dec. 13, 2017. 7 pages.
Notice of Allowance for U.S. Appl. No. 15/166,191 dated Oct. 18, 2108. 8 pages.
Diani et al., "Ground clutter model for airborne MPRF radars in look-down search mode", IDD Proc.-Radar, Sonar Navig., vol. 143, No. 2. Apr. 1996. 8 pages.
First Office Acton for CN Patent Application No. 201510604462.9 dated Jul. 25, 2019.

\* cited by examiner

SYSTEM FOR AND METHOD OF IMAGE PROCESSING FOR LOW VISIBILITY LANDING APPLICATIONS

CROSS-REFERENCE TO RELATED PATENT APPLICATIONS

The present application is a continuation-in-part of U.S. patent application Ser. No. 14/482,681, filed Sep. 10, 2014 issued as U.S. Pat. No. 9,733,349 and is related to U.S. patent application Ser. No. 15/222,923, filed on Jul. 28, 2016 issued as U.S. Pat. No. 10,353,068, U.S. patent application Ser. No. 13/247,742 filed on Sep. 28, 2011 issued as U.S. Pat. No. 8,896,480, U.S. patent application Ser. No. 11/851,323 filed on Sep. 6, 2007 issued as U.S. Pat. No. 8,515,600, U.S. patent application Ser. No. 11/904,491 filed on Sep. 26, 2007 issued as U.S. Pat. No. 8,755,954, U.S. patent application Ser. No. 13/241,051, filed on Sep. 22, 2011 issued as U.S. Pat. No. 8,515,600, U.S. patent application Ser. No. 12/263,282, filed on Oct. 31, 2008 issued as U.S. Pat. No. 9,354,633 and U.S. patent application Ser. No. 12/180,293 filed Jul. 25, 2008 issued as U.S. Pat. No. 8,077,078, all of which are herein incorporated by reference in their entirety and assigned to the assignee of the present application.

BACKGROUND

Embodiments of the inventive concepts disclosed herein relate generally to aircraft sensing and/or display systems. Embodiments of the inventive concepts disclosed herein more specifically relate to an apparatus or method for the detection and/or display of runways and/or runway features using radar.

Displays are used in head down display (HDD) systems, head up display (HUD) systems including but not limited to fixed combiner displays and wearable displays such as helmet mounted display (HMD) and head worn display (HWD) systems. In aircraft applications, HUD and HDD systems advantageously display information from aircraft systems and sensors in a graphical and alphanumeric format. The display information can include an enhanced vision image from a camera or other imaging sensor (such as a visible light imaging sensor, infrared imaging sensor, millimeter wave radar imager, or combinations thereof) and/or a synthetic vision image from a synthetic vision computer in certain applications. The enhanced vision image can be merged with a synthetic vision image to provide a single image to the pilot. The image can further contain or be augmented by alphanumeric and iconic symbology that highlights or enhances the image content.

Enhanced flight vision systems (EFVSs) are often utilized to view the runway during the approach or landing phases. Infrared cameras and light sensors used by conventional enhanced vision systems can have a limited ability to penetrate certain challenging weather conditions, such as CAT III fog and heavy precipitation. For example, infrared-based systems can have difficulty detecting and displaying runways in low visibility conditions (e.g., under 300 feet runway visual range (RVR)).

EFVSs have been proposed which use radio frequency (RF) signals such as millimeter wave (mmW) radar and/or weather radar signals (X-band, K-band, etc.). RF signals are better able to penetrate challenging weather conditions. However, conventional use of RF signals often deliver images of lower resolution when compared to infrared-based cameras and light sensors. Various weather radar systems capable of providing radar data for an image of a runway are described in the applications incorporated herein by reference.

FAA-certified EFVS can allow pilots landing under instrument flight rules to operate below certain specified altitudes during instrument approaches even when the airport environment is not visible to the unaided eye. Conventional SVS cannot provide enhanced flight visibility, especially the capability to show a real world sensed image of the runway during an impending landing. The use of an integrity monitor for an SVS may allow for higher design assurance levels which could lead to the use of monitored SVS for lower landing minimum credit (e.g., would allow a pilot with a monitored SVS display system to land where a non-monitored SVS pilot would not be otherwise allowed to land due to the current low visibility or RVR restrictions). Accordingly, there have been proposals to provide a monitor for an SVS system based upon various instruments. The use of additional equipment to provide an integrity monitor for the SVS can add to the cost and weight of the aircraft.

SUMMARY

In one aspect, the inventive concepts disclosed herein are directed to an apparatus for use with an aircraft radar system having a radar antenna. The apparatus includes processing electronics configured to cause the radar antenna to emit radar pulses having a pulse width less than 6 microseconds and configured to receive radar data associated with signals associated with the radar antenna. The radar data is processed to identify centroids associated with indications of runway lights or runway infrastructure (e.g., light stanchions) for a runway in the radar data. A best fit analysis of the centroids is used to identify a runway centerline associated with the runway.

In another aspect, the inventive concepts disclosed herein are directed to a method of using radar return data from a radar system on an aircraft. The method includes receiving the radar return data from the radar system, and processing image data associated with the radar return data to identify a runway centerline using centroids associated with groups of returns in the image data. The method also includes providing image or symbolic data including a representation of the runway centerline.

In yet another aspect, the inventive concepts disclosed herein are directed to a weather radar system. The weather radar system includes means for receiving weather radar data. The weather radar system also includes means for identifying runway lights from the weather radar data and providing a runway centerline depiction on an electronic display.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE EXEMPLARY EMBODIMENTS

Figure 1:
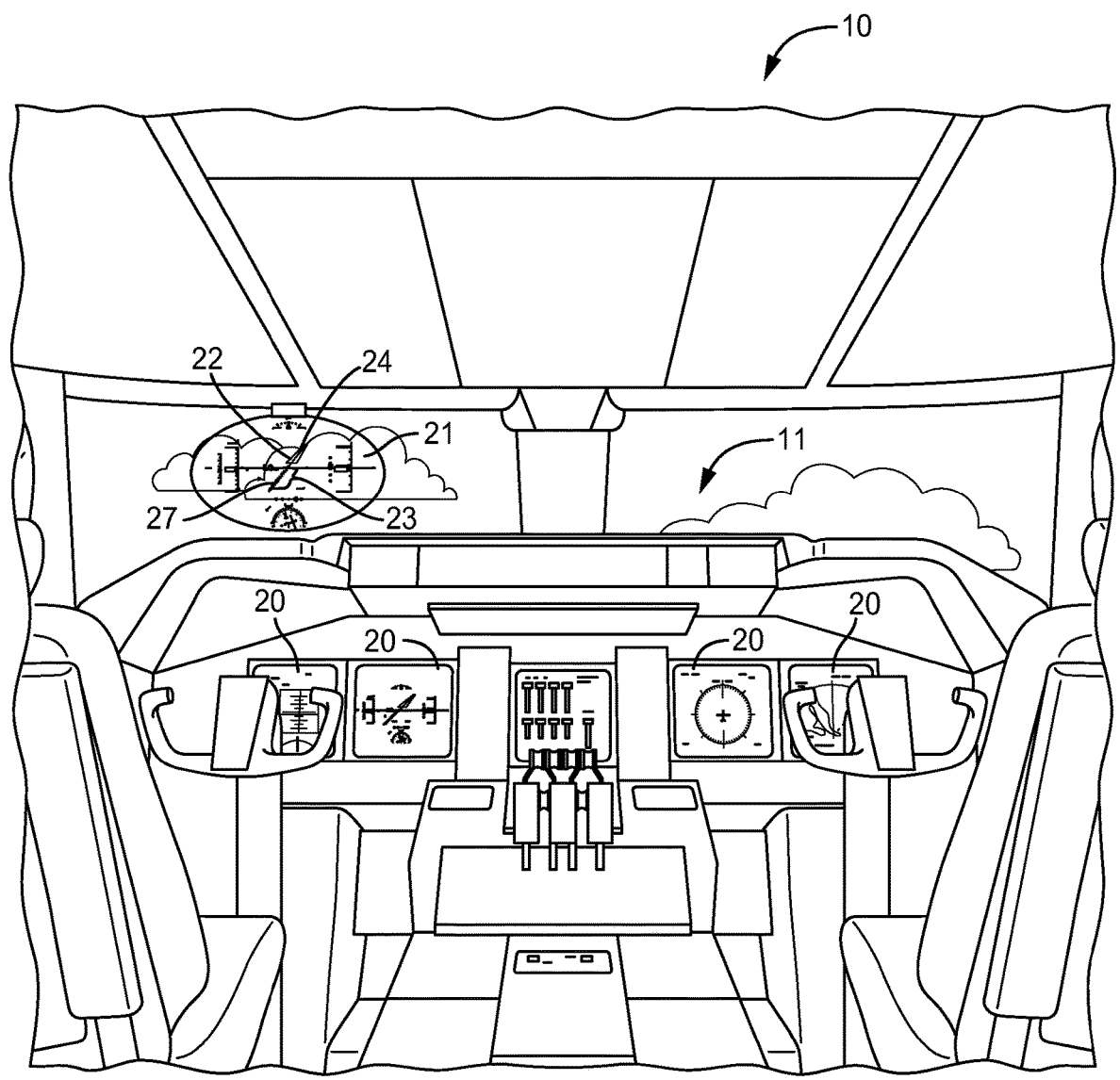
FIG. 1 is a schematic illustration of an aircraft control center or cockpit according to exemplary aspects of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Embodiments of the inventive concepts disclosed herein are directed to a radar system, such as, a weather radar system, that can be used to detect features of a runway environment. In one embodiment, features having a high radar cross-section (RCS) are utilized to detect features associated with the runway. For example, metal stanchions that support the Approach Light System (ALS) and parabolic reflectors of the light bulbs whether on or off can be identified in radar data associated with scans of the runway. In another embodiment, metal content of embedded runway centerlines can be identified in the radar data. Utilizing the high radar cross section associated with metal content of runway lighting advantageously allows detection to be achieved whether at day or night, regardless of whether runway lights are on or are off.

In some embodiments, radar data from a legacy weather radar system can be used to provide a situational awareness sensor that can provide alignment confirmation in all weather conditions in the final phases of flight. In some embodiments, the systems and methods can be utilized as an extension to focal plane array-based (FPA-based) EFVS or as extended centerline generators using sensing rather than other navigation. The extended centerlines are provided on a display of a combined vision system (CVS) and is used as an alignment confirmation tool for an SVS solution, thereby providing higher system integrity for the SVS, or as an enabler for a lower minimum minima for low visibility operations.

The systems and methods detect and display a runway centerline from weather radar data (e.g., using a HUD including runway symbology or icons derived from radar data) from legacy weather radar hardware already available on existing aircraft in some embodiments. In some embodiments, the weather radar system is configured to provide short pulse lengths (e.g., less than 6 microseconds, less than 3 microseconds, etc.). The ALS installations consist of 7-12 light stanchions separated by 100' in range in some embodiments.

With adequate range resolution, as well as the location of the runway threshold, the presence of the ALS or runway centerline lights is detectable in some embodiments. Without improvements in the azimuth resolution of legacy weather radar hardware, the returned detections of the 5-light and 15-light ALS barrettes are substantially spread in azimuth, and centroiding techniques are used to provide an image of the runway centerline in some embodiments. An individual group of returns or blobs has a centroid that may not be overly accurate in positioning the blob itself, but statistical regression of the location of each centroid in each group or blob leads to a best fit extended runway centerline with the specificity required to deliver the desired accuracy for lateral alignment monitoring in some embodiments.

In some embodiments, the systems and methods take advantage of regular, periodic, equal spacing nature of visual aids such as ALS lights and runway centerline lights. The strict definition associated with the spacing of such visual aids which by design are very specific to air field environments can be used to uniquely identify runways on approach in one embodiment. For example, the spacing and location (the spatial frequency) of the features can be specified with very high accuracy according to Federal Aviation Administration (FAA) and International Civil Aviation Organization (ICAO) standards, rules and specifications. In one embodiment, Fourier transforms or related techniques, such as, discrete cosine transform (DCT) functions, etc., can be used to detect or assist detection of the periodic pattern.

Systems and methods can be provided which detect characteristics of runway features using runway lights disposed in various patterns. According to one example, runway centerline lights are spaced at 50-foot intervals. See "Aeronautical Information Manual Official Guide to Basic Flight Information and ATC Procedures, Federal Aviation Administration," Jul. 24, 2014. According to another example, runway touchdown zone lights are provided for runways intended for precision approach Category II or III operations. Runway touchdown zone lights extend from the runway threshold for a distance of 900 m in a pattern formed by pairs of barrettes symmetrically located about the runway centerline. Each barrette consists of three light units at 1.5 m apart. The first pair of barrettes are located at 60 m from the threshold, and subsequent barrettes are spaced longitudinally at 60 m apart according to one example. According to another example, runway center lights are placed at longitudinal intervals of 60 m. According to another example, lights for a precision approach Category II and III lighting system include row of lights on the extended centerline of the runway extending, wherever possible, over a distance of 900 m from the runway threshold. In addition, the system can have two side rows of lights, extending 270 m from the threshold, and 5 crossbars, at 150 m, 300 m, 450 m, 600 m and 750 m from the threshold. In another example, a precision landing system includes the lights forming the centerline placed at longitudinal intervals of 30 m with the innermost light located 30 m from the threshold. See, CHAPTER 7: VISUAL AIDS FOR NAVIGATION-LIGHTS, aai.aero/aai_employees/chapter_7.pdf. Embodiments are not limited to any of the specific examples given above or any particular standards, specifications, rules, or governing bodies.

Referring to FIG. 1, an illustration of a display system 10 for use in an aircraft control center 11 or cockpit is shown, according to some embodiments. The aircraft control center 11 includes flight displays 20 embodied as head down displays (HDDs). Aircraft control center 11 can also include a combiner 21 association with a head up display (HUD) system. In some embodiments, the combiner 21 is provided as part of a wearable HUD. Conformal images are provided on the combiner 21 for viewing by the pilot or flight crew.

The flight displays 20 and the combiner 21 can be used to provide information to the flight crew, thereby increasing visual range and enhancing decision-making abilities. In some embodiments, the flight displays 20 and combiner 21 can include a weather display, a joint display, a weather radar map, a terrain display, an SVS image or an EFVS image. For example, the flight displays 20 and the combiner 21 can include a display configured to display a three dimensional perspective image of terrain and/or weather information or other view of terrain and/or weather information (e.g., plan view, horizontal view, vertical view, or combinations thereof).

According to an exemplary embodiment, at least one of the flight displays 20 or combiner 21 is configured to provide an image of a runway 22 or features associated with the runway 22 (e.g., during approach and landing). In some embodiments, a symbol or icon for the runway 22 can be provided on the displays 20 or combiner 21. A set of runway features, such as, ALS lights 23 or runway centerline lights 24, can be indicated on the flight displays 20 or combiner 21. In some embodiments, an extended runway centerline 27 is provided on the displays 20 or combiner 21. The placement of extended runway centerline 27 is determined at least in part from the detection of runway features (e.g., the ALS lights 23 and runway centerline lights 24) in image data associated with radar data. In some embodiment, at least one of the displays 20 or combiner 21 displays a merged image of terrain derived from two or more of enhanced vision data, radar data, and SVS data.

The flight displays 20 and/or combiner 21 can be configured to provide an indication to a flight crew as to whether the extended runway centerline 27 (or the ALS lights 23 and runway centerline lights 24) associated with the radar data and/or SVS data displayed on the flight displays 20 or combiner 21 are correct or incorrect. In some embodiments, such an indication notifies the crew if the integrity of the SVS is sufficient for lower authorized decision heights and minimum descent altitudes in low visibility conditions.

Figure 2:
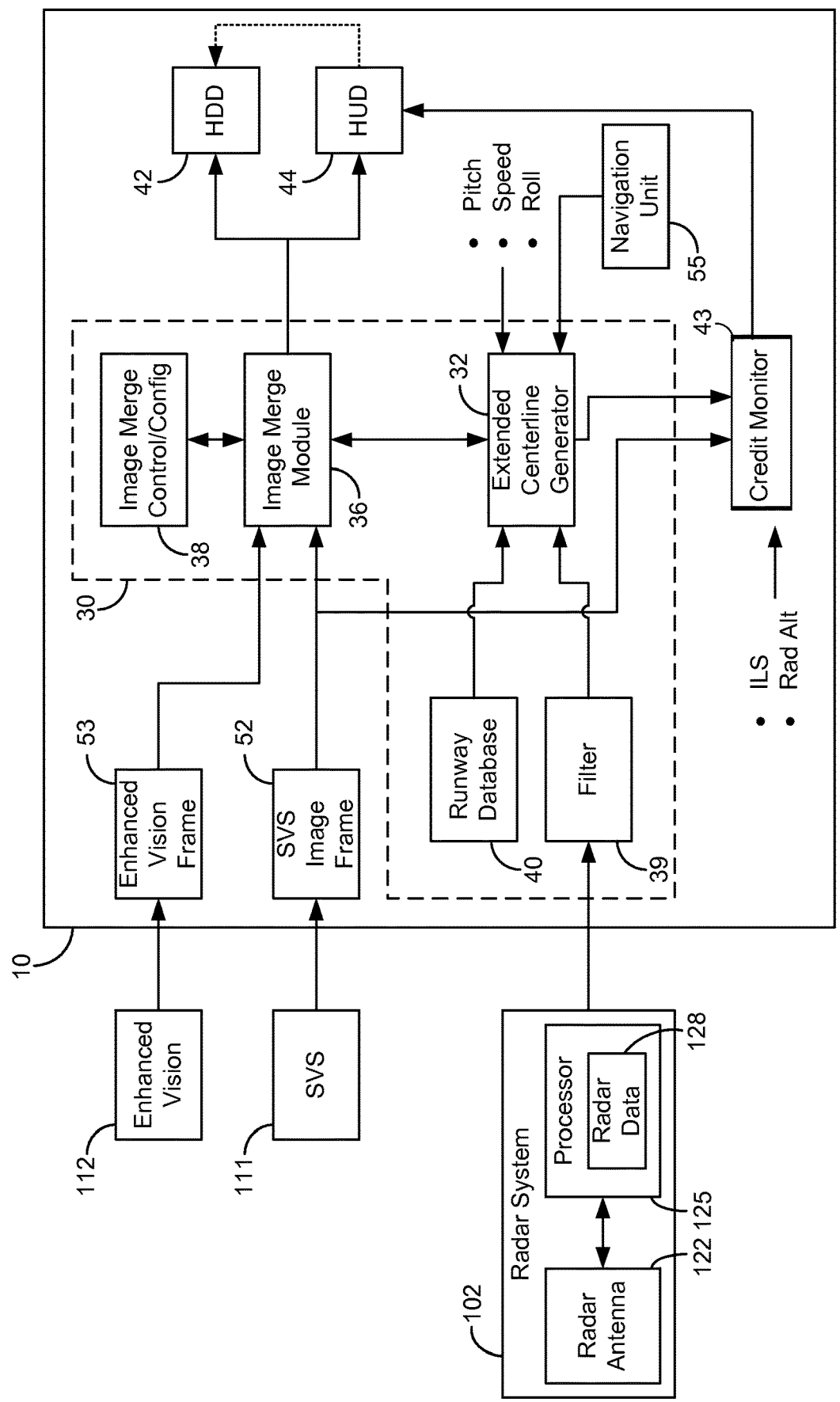
FIG. 2 is a schematic general block diagram of a display system for displaying an image or symbols derived from radar data according to exemplary aspects of the inventive concepts disclosed herein.

Referring to FIG. 2, the display system 10 can be utilized for providing an image to any of the flight displays 20 or combiner 21. The display system 10 includes a processor 30 (including an extended centerline generator 32, an image merge module 36, an image merge control/configuration module 38, a filter 39, and a runway database 40), an HDD computer 42, a credit monitor 43, a HUD computer 44, a memory 52, and a memory 53. The display system 10 includes or is in communication with a navigation unit 55, a radar system 102 an SVS 111, and an EVS 112. In some embodiments, the processor 30, and computers 42 and 44 are implemented as a single processing/computing resource providing multiple applications.

The EVS 112 and SVS 111 are optional in some embodiments. The memory 53 is for storing enhanced vision frame from the EVS 112, and the memory 52 is for storing enhanced vision frame from the SVS 111. According to some embodiments, the SVS 111 can be any electronic system or device for providing a computer generated image of the external scene topography. According to some embodiments, the EVS 112 can be any electronic system or device for providing a sensed image of the external scene topography. The EVS 112 can be an infrared camera in some embodiments.

The filter 39, extended centerline generator 32, image merge module 36, image merge control/configuration module 38, and credit monitor 43 can be embodied as software modules operating on a computing platform or the processor 30 and can be stored on a non-transitory medium. The processor 30 can be part of or integrated with the radar system 102, SVS 111, EVS 112, HDD computer 42, or HUD computer 44 in some embodiments. In one embodiment, the processor 30 is an independent computing platform.

The radar system 102 is a weather radar system generally located inside the nose of the aircraft, inside a cockpit of the aircraft, on the top of the aircraft or on the tail of the aircraft. The radar system 102 includes a radar antenna 122 and a processor 125. The radar system 102 can be a legacy weather radar system, such as, a Multiscan™ radar system from Rockwell Collins, Inc. The type of radar system 102 and data gathering techniques are not discussed in the specification in a limiting fashion.

The processor 125 includes a radar data storage unit 128 in some embodiments. The processor 125 receives radar returns (e.g., weather radar return data) from the radar antenna 122, processes the radar returns and stores radar return data in the radar data storage unit 128. The data stored in the radar data storage unit 128 includes an image frame representing the data from a radar scan of the Earth's surface (e.g., near the runway 22) at an approach phase of flight in some embodiments. The processor 125 converts the radar return data to the image frame in some embodiments.

The radar system 102 provides the radar data (e.g., weather radar return data) or the image data in the radar data storage unit 128 to the filter 39 in some embodiments. Alternatively, the processor 30 can build the image frame based upon radar return data (filtered or unfiltered) from the radar system 102. Similarly, the SVS 111 can provide data or an image frame for the SVS image. Alternatively, the display system 10 can provide the data or image frame to the memory 52 in response to data from the SVS 111. The EVS 112 similarly provides data or an image frame to the memory 53.

In some embodiments, the radar system 102 provides data representing a 120 degree field of view in accordance with a weather radar sweep which takes approximately five seconds to complete in one embodiment. The sweep can be limited during approach to be a 30 degree sweep which requires five seconds before new data is available for display in certain embodiments. The sweep is directed toward the surface of the Earth so that returns are obtained which allow runway features to be detected. The sweep can provide pulses having a width of less than 6 microseconds (e.g., less than 3-8 microseconds) in some embodiments. Various types of sweeps, scans and timings of sweeps and scans can be utilized without departing from the scope of the invention. In some embodiments, the radar system 102 is embodied as a weather radar, thereby allowing the display system 10 to use existing avionic equipment to achieve a precise runway centerline detector as described below. Other radar systems may or may not operate according to the above specifications and yet utilize aspects for the inventive concepts disclosed herein.

The display system 10 combines or fuses images from the SVS 111 or EVS 112 and the representations of runway features (e.g., the ALS lights 23 and runway centerline lights 24) derived from radar data from the radar system 102 to provide an overall image provided to the pilot according to one embodiment. The images are fused in a format that integrates features of the SVS 111, EVS 112 and the representation of the runway features from radar return data associated with the radar system 102 in some embodiments. In some embodiments, the representations of runway features are fused with HUD symbology for display on the combiner 21.

The SVS 111 and the extended centerline generator 32 receive aircraft position data from an aircraft data source, such as, the navigation unit 55. The navigation unit 55 can include any system or sensor (or combination thereof) that provides navigation data or aircraft flight parameters. For example, navigation unit 55 can have numerous sub-systems. Sub-systems which provide aircraft position data and flight parameter data could include, but are not limited to, an inertial navigation system (INS), a global navigation satellite system (e.g., global positioning system (GPS)), air data sensors, compasses, and a flight management computer (FMC).

The extended centerline generator 32 utilizes the processed or filtered data from the filter 39 or unfiltered data stored in the radar data storage unit 128 to identify particular runway features. In some embodiments, the extended centerline generator 32 or the processor 125 processes the radar data or the filtered radar data to provide image data where intensity is representative of radar return energy. The data can be processed so that only higher energy returns are shown in the image data (e.g., radar returns having an energy below a threshold are eliminated). The image data is processed to determine the location of groups of radar returns or blobs. The groups of radar returns or blobs are identified in the image data by identifying higher intensity pixels in close proximity (e.g., a group of pixels with neighboring pixels at a higher intensity level). Such groups are associated with radar returns that come from objects with high radar reflectivity, such as, the ALS lights 23 and runway centerline lights 24 or infrastructure thereof. The objects or runway infrastructure can be passive runway reflectors, lights, metal stanchions, or other man-made radar reflecting objects in some embodiments. In some embodiments, the radar data includes discernible returns from stanchions as opposed to other light hardware. The centroids of the blobs are determined and a line through the centroids of the blobs is displayed as the extended runway centerline 27 (FIG. 1). In some embodiments, at least five to seven centroids of blobs are utilized.

In some embodiments, the extended centerline generator 32 uses navigation parameters, phase of flight, and information the runway database to qualify the blobs as potential reflections from the ALS lights 23 and runway centerline lights 24. In some embodiments, the extended centerline generator 32 begins processing data in response to an approach phase of flight and identifies blobs that are in the expected proximity and alignment based upon the runway positon data in the runway database 40 and the positon and orientation of the aircraft.

In some embodiments, the filter 39 processes the radar data for identification of runway features. For example, the filter 39 can be embodied as a Fourier transform, a discrete cosine transform (DCT), a spatial frequency filter, a pattern matching filter, for detecting periodic patterns associated with features of the runway in the radar return data stored in the radar data storage unit 128. A Fourier transform of the radar return data in the radar data storage unit 128 has extremely high values at the spatial frequency associated with light barrette installations and/or other high radar cross-section features and provides strong confirmation of alignment to a runway or taxi way as identified by an extended centerline generator 32. Proper design of the filter 39 can ensure detection of these spatial frequencies as they happen in a rotation-invariant and scale-invariant fashion. The threshold for radar returns can be set relatively high to eliminate returns that are not from high radar-cross section objects in some embodiments.

In some embodiments, the Fourier transform can be performed on the radar data in the radar data storage unit 128 in the plan position indicator (PPI) domain. In some embodiments, the radar data in the PPI domain is filtered before perspective transformation into C-scope domain. Alternatively, the transform can be performed on the C-scope transformation of the radar data taking into account perspective compression with elevation. In some embodiments, the transform can be set to the expected spatial frequencies of runway light features. Alternatively, the PPI domain radar data can be used directly for comparison to a PPI-like SVS solution, thereby altogether obviating the need for processing the radar data into a C-scope domain.

The runway features (e.g., the ALS lights 23 and runway centerline lights 24) can be identified by comparing patterns with reference patterns stored in the runway database 40 for such features in some embodiments. The database 40 can also store expected spatial frequencies for the filter 39. The particular patterns can be chosen utilizing a location parameter from the navigation unit 55. For example, the runway light pattern for particular airports and approaches can be stored in database 40.

The extended centerline generator 32 can utilize roll, pitch, and speed of the aircraft to adjust the patterns before comparing to stored patterns. The reference patterns can be stored as mathematical representations, in a look-up table, as a video frame, etc. In one embodiment, longitudinal patterns, lateral patterns or both lateral and longitudinal patterns can be detected. All runway approach lighting systems in typical modern installations fall into few possible spacing categories, so that a detection of a runway may not use an explicit database of runway features in some embodiments.

The extended centerline generator 32 can provide data for icons or symbols (e.g., the extended runway centerline 27) for merger or provision on the flight displays 20 or combiner 21 via the HDD computer 42 or HUD computer 44. The symbols can include dashes, circles, or other indications of the presence of runway lights in some embodiments.

In some embodiments, data for runway feature symbols are provided directly to HDD computer 42 or HUD computer 44 for providing indications on displays 20 or combiner 21. In another embodiment, the data for runway feature symbols can be provided to image merge function module 26. Image merge function module 26 receives an EVS frame from memory 53 or an SVS frame from memory 52 and merges the data for runway feature symbols to appropriately display an EVS image or an SVS image with the runway feature symbols.

The processor 30 executes a fusion processing algorithm in the module 26 for fusing the frames from the memory 52, memory 53, and extended centerline generator 32 provided as video signals. This fusion process may include special formatting (positioning, sizing, cropping, etc.) of specific features or the entire image from a specific image source based on other sensor inputs or aircraft. After the combined or fused image has been completed, the entire image is offset and scaled to fit appropriately within the total HUD field-of-view and conformally overlay the outside scene, which is viewed through combiner 21 of the HUD. In addition, the overall fused image contrast is standardized with the brightness/contrast to support the brightness/contrast controls of the HUD.

Precise localization of the exact spacing of runway light locations in actual physical distance units (e.g., 100 feet, 200 feet) can allow exact and very reliable confirmation of ALS light and runway centerline light detection via the filter 39 in one embodiment. In one embodiment, localization of the pattern of runway lights allows accurate measurement of the longitudinal location of the aircraft with respect to the runway. Accurate longitudinal location is particularly advantageous for pilots because judging longitudinal location from perspective imagery such as imagery from focal-plane based enhanced flight vision systems or C-scope transform can be difficult.

In some embodiments, the extended runway centerline 27 can be extracted using a very precise line fit using the filter 39 or extended centerline generator 32. The extended runway centerline 27 can even be extracted in the presence of some lateral direction uncertainty. A Hough transform or statistical regression can be utilized to reduce lateral uncertainty.

The credit monitor 43 can receive data from the SVS 111, EVS 112, and radar system 102 to determine position accuracy for SVS 111. The credit monitor 43 can also receive signals from various aircraft sensors including integrated landing system (ILS), radio altimeters, an inertial navigation system (INS) and/or other sensors. The credit monitor 43 can provide an indication of the result of an integrity check for display via HDD computer 42 and HUD computer 44.

The extended centerline generator 32 can provide data associated with the centroiding of blobs associated with the location of the ALS lights 23 and runway centerline lights 24 (or runway infrastructure (e.g., runway reflectors, metal stanchions, or other man-made radar reflecting objects)) to confirm alignment for the SVS solution of SVS 111. In some embodiments, the image data of the extended runway centerline from the extended centerline generator 32 is compared to the image data from the SVS 111. A comparison of the extended runway centerlines in each image provides an indication of alignment. In some embodiments, both extended centerlines are displayed so the pilot can view any misalignment. The confirmed alignment derived from radar data can effectively be used in the credit monitor 43 for the HUD computer 44, thereby allowing the use of lower landing minima in SVS 111 without EVS according to one embodiment.

Various matching algorithms can be utilized to determine if the solutions provided by the SVS and extended centerline generator 32 are accurate. If the compare function indicates that there is not a match, the credit monitor 43 indicates that lower minimum approaches are not enabled as there may be a database error or error with system 102 or SVS 111. The indication can be provided on the combiner 21 associated with the HUD computer 44 or on the flight displays 20. Applicants believe that use of the credit monitor 43 and the display system 10 may assist in a reduction of minimum from a 200 foot decision height to a 100 foot for SVS 111, or lower, due to the high design assurance and integrity brought about by the comparison of the information from multiple independent subsystems.

The image merge control/configuration module 38 can provide format adjustments to data. The SVS 111 and radar system 102 can have their own specific interface type and format. Also, each display of the flight displays 20 and combiner 21 may require specific formatting. A standard format can be a format used in HUD processing functions. Module 38 can be implemented in hardware, software, or combinations thereof.

Figure 3:
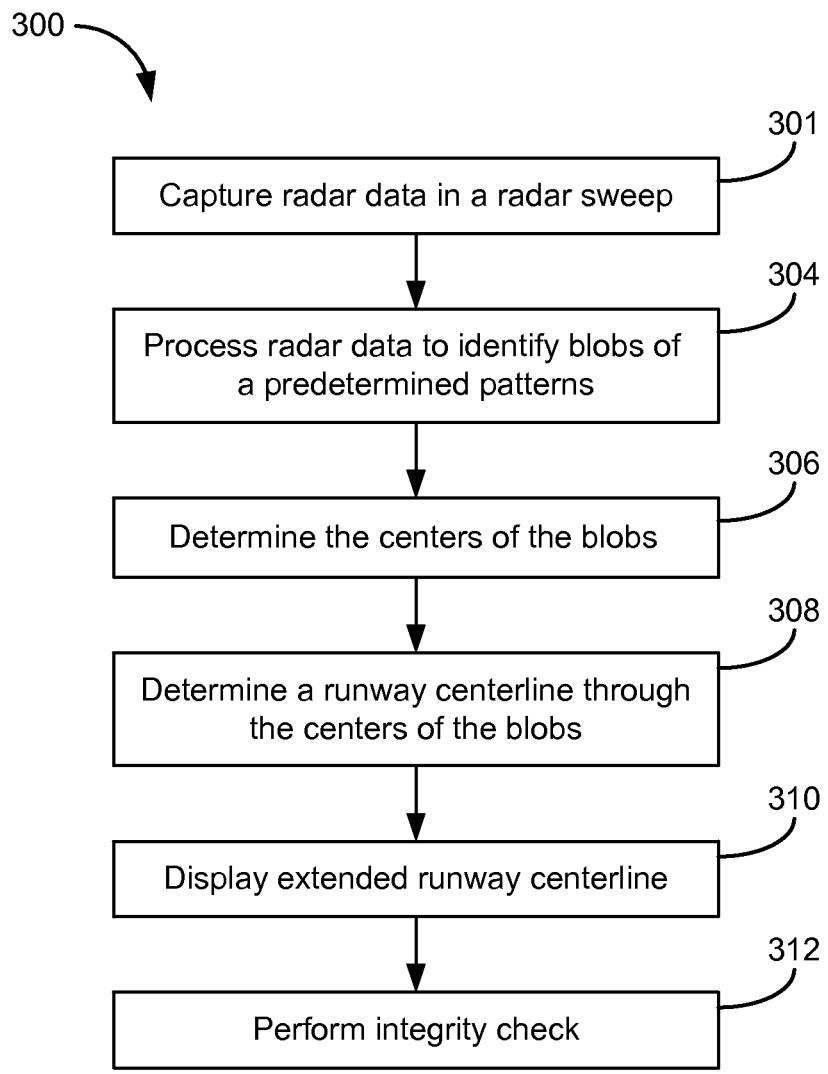
FIG. 3 is a flow diagram showing an exemplary process used by the system illustrated in FIG. 2 according to exemplary aspects of the inventive concepts disclosed herein.

With reference to FIG. 3, a flow 300 can be performed by the display system 10 for runway identification and display of runway data. The flow 300 is performed when in the vicinity of the airport or upon approach in some embodiments.

At an operation 301, the radar system 102 captures radar data in a radar sweep. The radar sweep is performed with pulses having smaller widths for greater range resolution in some embodiments. At an operation 304, the radar data is processed to provide image data containing groups of returns or blobs having higher return energy. As discussed above, filtering or related techniques by the filter 39 can be utilized to identify pre-determined patterns or accentuate patterns associated with the ALS lights 23 and runway centerline lights 24. In some embodiments, operation 304 uses runway data to assist the identification of the blobs. In some embodiments, the radar data or image data is skeletonized to remove lower energy returns (e.g., returns below a threshold level are removed).

At an operation 306, centroiding is utilized to determine a center of each of the blobs. At an operation 308, the extended runway centerline 27 is determined using a line through the centroids of the blobs. Identification of an individual blob's centroid may not be overly accurate in positioning the blob itself, but statistical regression of the location of the centroid of each of the blobs leads to a best fit extended runway centerline with the specificity required to deliver the desired accuracy for lateral alignment monitoring in some embodiments.

At an operation 310, the extended runway centerline 27 (FIG. 1) is displayed via a display computer such as the HDD computer 42 or HUD computer 44 (FIG. 2). In some embodiments, only the extended runway centerline 27 is displayed to provide a cleaner image (e.g., blobs and other images associated with the radar data are not displayed). In some embodiments, any or all of five display layers are provided and displayed (e.g., a radar data layer, an SVS data layer, an EVS layer, a HUD layer, and an extended centerline layer).

At an operation 312, the credit monitor 43 can use the determined locations associated with the runway features (e.g., the extended centerline) to perform an integrity check associated with the SVS data in memory 52. After operation 310, flow 300 can return to the operation 301.

The processor 30 can be any hardware and/or software processor or processing architecture capable of executing instructions and operating on navigational and radar data. The processor 30 can be capable of determining navigational information such as altitude, heading, bearing, and location based on data from aircraft sensors. Applicants note that flow 300 and runway identification can be performed in various equipment on the aircraft including in a HUD computer, a display processor, radar system 102, a navigation system, SVS 111, etc. in accordance with an exemplary embodiment.

Figure 4:
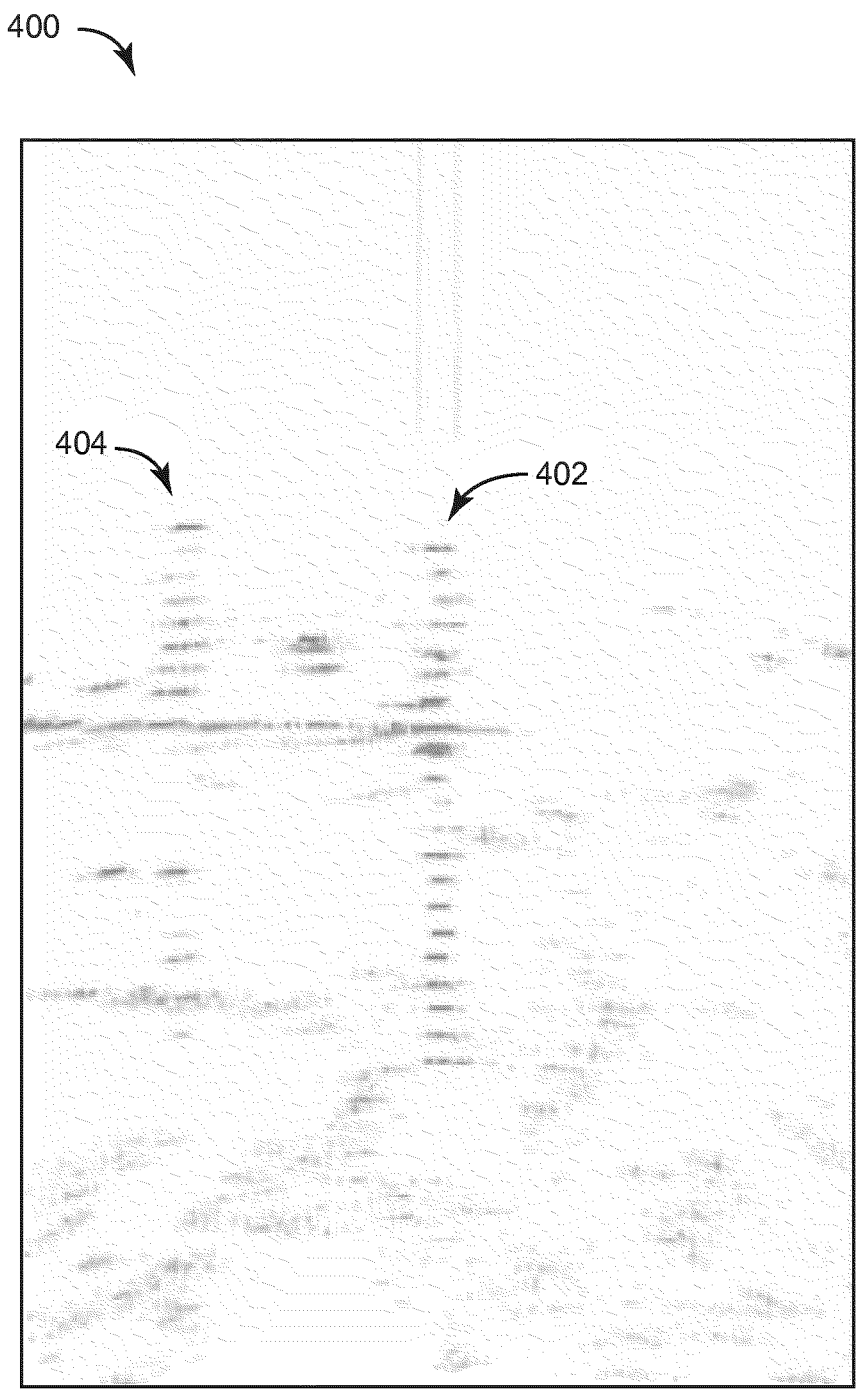
FIG. 4 is an illustration of image data generated from radar data in an environment including runway lights using the display system illustrated in FIG. 2 according to exemplary aspects of the inventive concepts disclosed herein.
Figure 5:
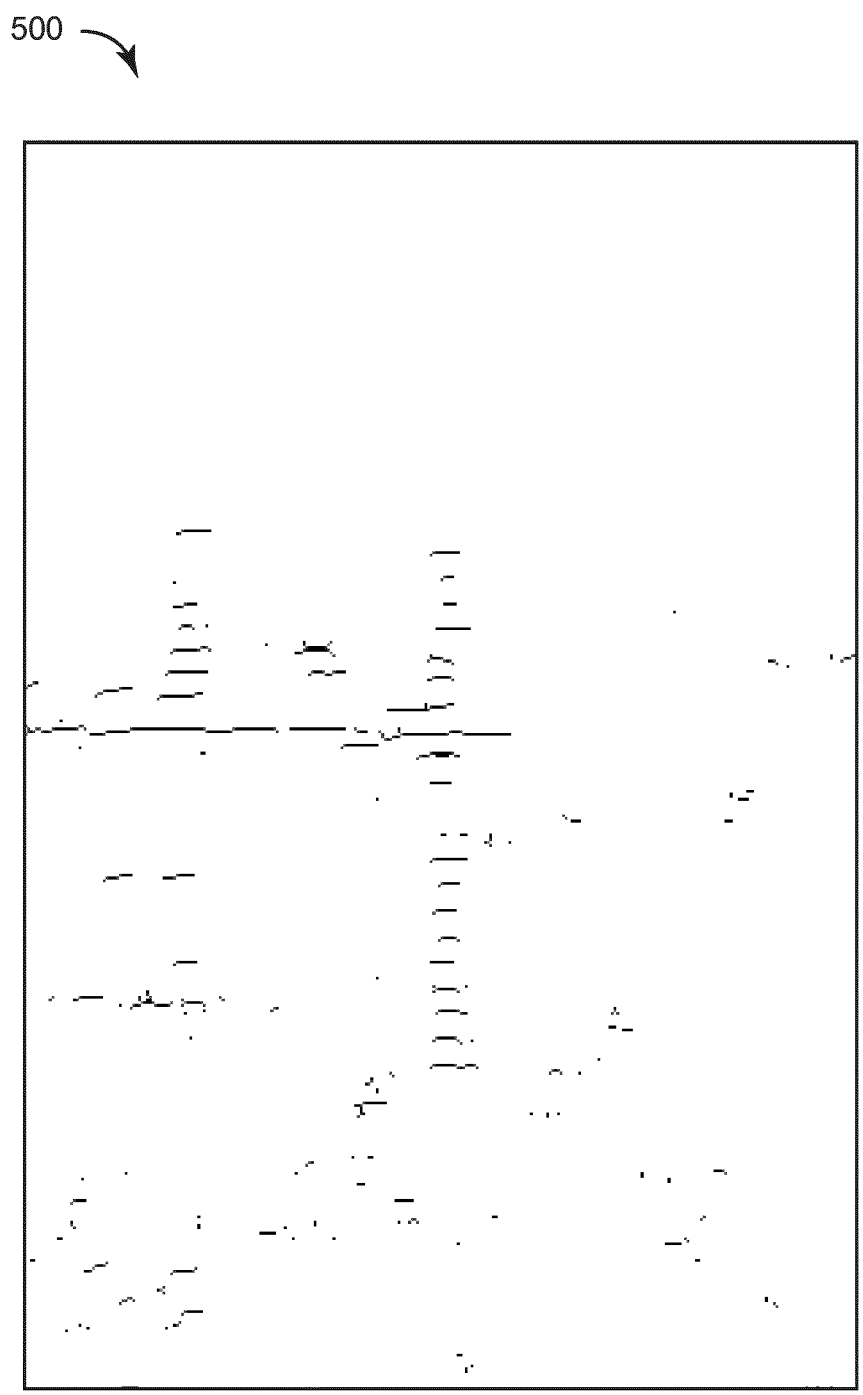
FIG. 5 is an illustration of the image data illustrated in FIG. 4 processed to assist the identification of the runway lights according to exemplary aspects of the inventive concepts disclosed herein.

With reference to FIG. 4, a representation 400 of radar data (e.g., as image data) associated with the radar data storage unit 128 includes a set of blobs 402 associated with the ALS lights 23 and runway centerline lights 24 and additional blobs 404. With reference to FIG. 5, the radar data associated with representation 400 is processed (e.g., skeletonized to provide a cleaner image as shown in representation 500. The processing can be performed by the filter 39 and removes returns that are not in groups having energy return and proximity to neighboring return characteristics associated with reflections from the ALS lights 23 and runway centerline lights 24 in some embodiments.

Figure 6:
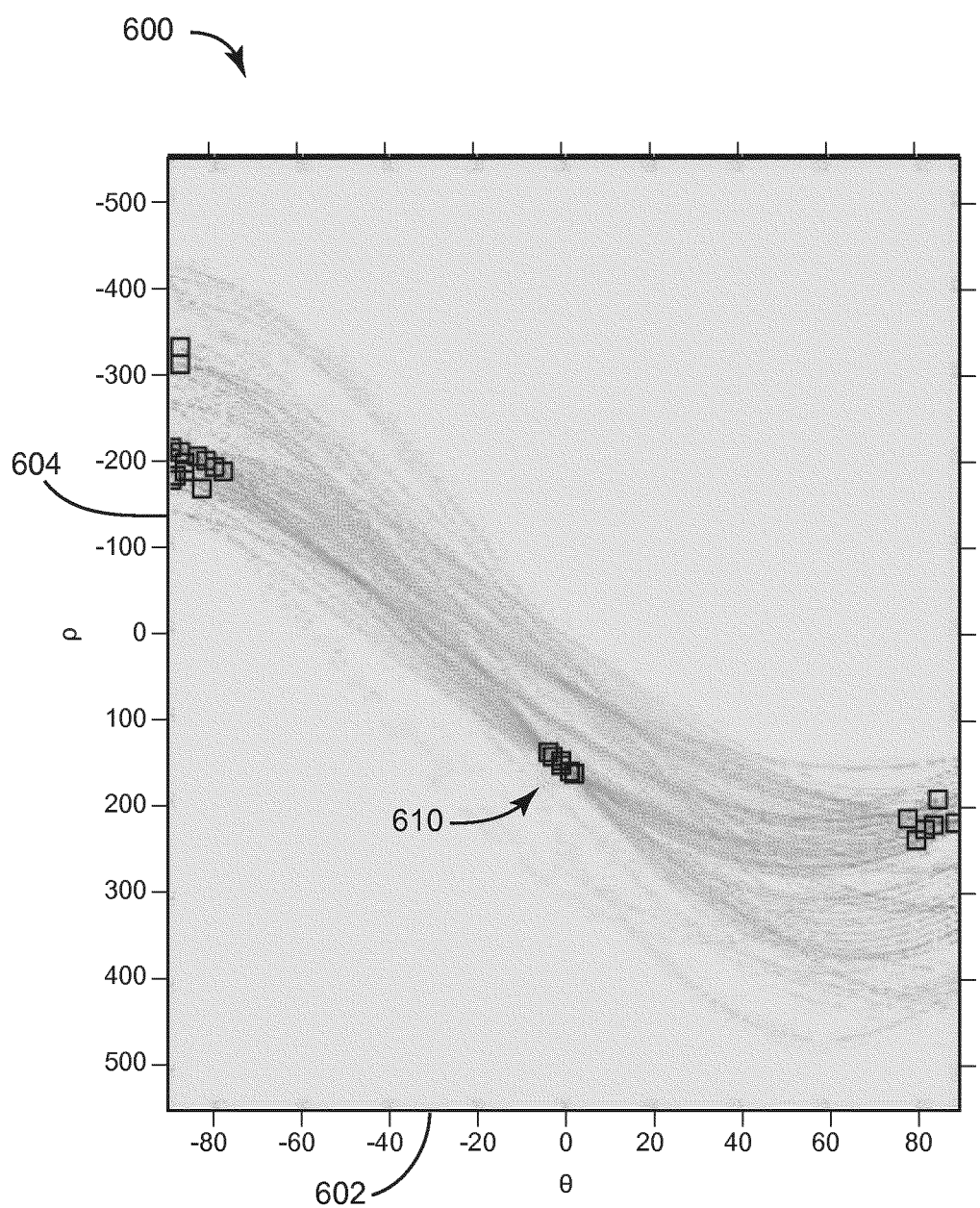
FIG. 6 is an illustration of a Hough transform of the image data illustrated in FIG. 5 according to exemplary aspects of the inventive concepts disclosed herein.

With reference to FIG. 6, a representation 600 of a Hough transform for the image data associated with representation 500 is provided on an X-axis 602 indicating the angle θ and a Y axis 604 representing a radius p. The Hough transform is a process for feature extraction such as identification of lines in an image. The peak group at the angle θ of zero degrees and the radius p at a maximum is an indication of points for the extended centerline and are represented by rectangles 610.

Figure 7:
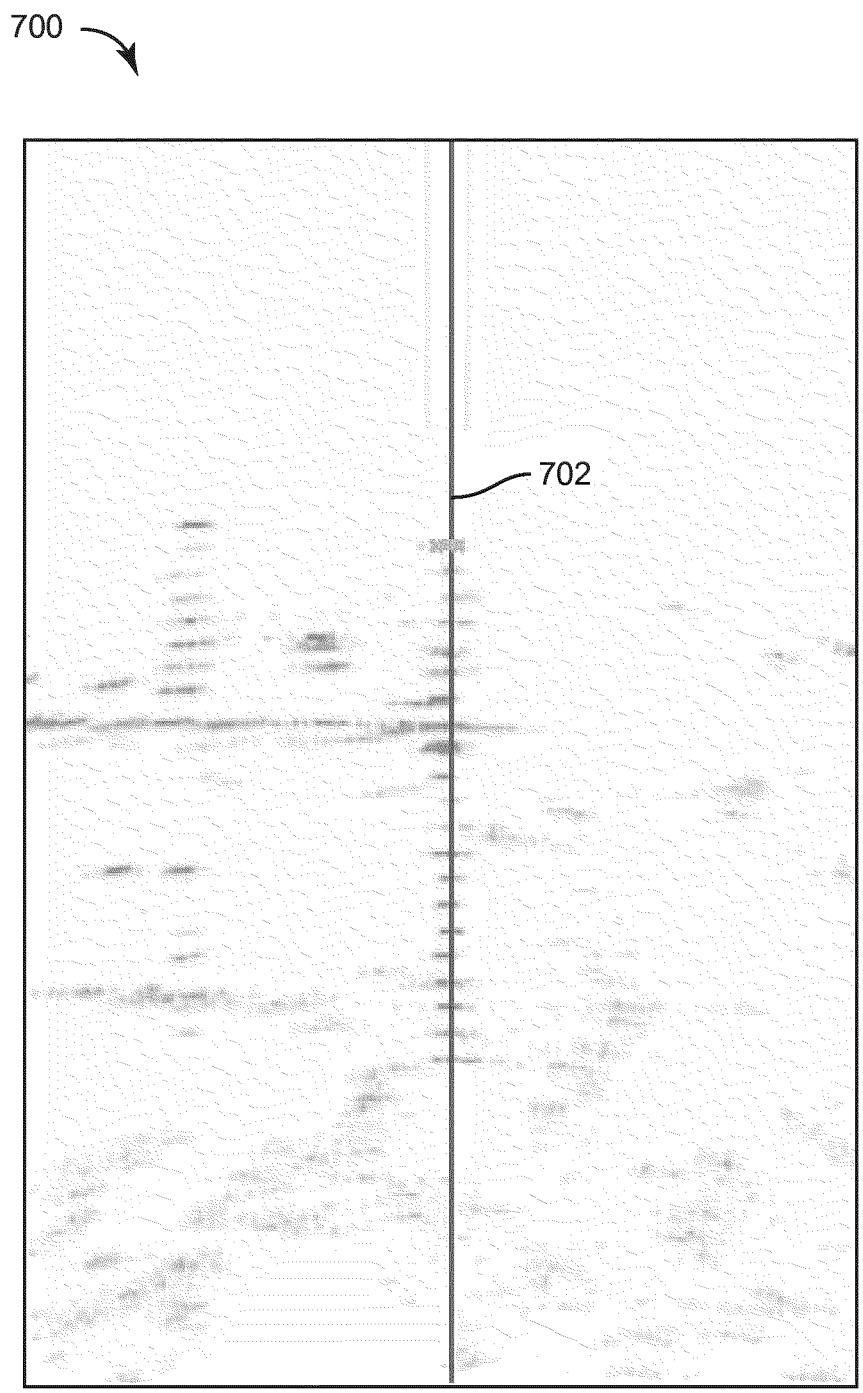
FIG. 7 is an illustration of the image data illustrated in FIG. 5 including an extended centerline drawn through centroids of radar return blobs according to exemplary aspects of the inventive concepts disclosed herein.

With reference to FIG. 7, the Hough transform is used to provide an extended runway centerline 702 for the image data associated with representation 500. The extended runway centerline 702 can be extrapolated using a best fit technique.

Figure 8:
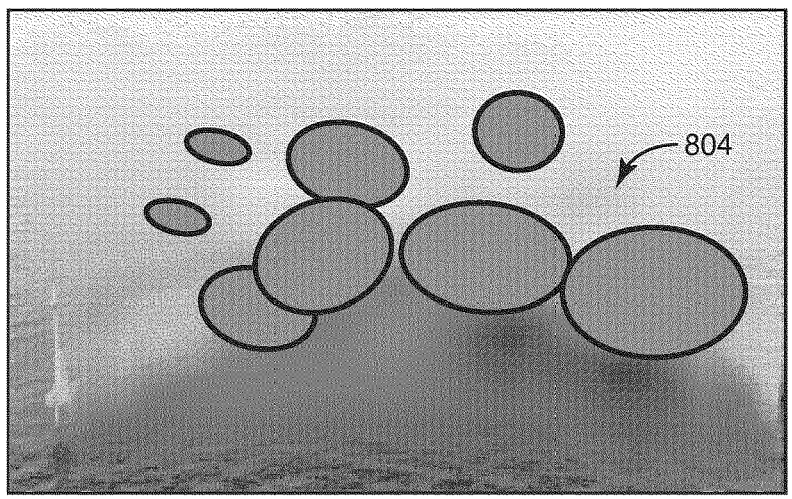
FIG. 8 is an illustration of image data generated from radar data in an environment including with oil rigs using the display system illustrated in FIG. 2 according to exemplary aspects of the inventive concepts disclosed herein.
Figure 9:
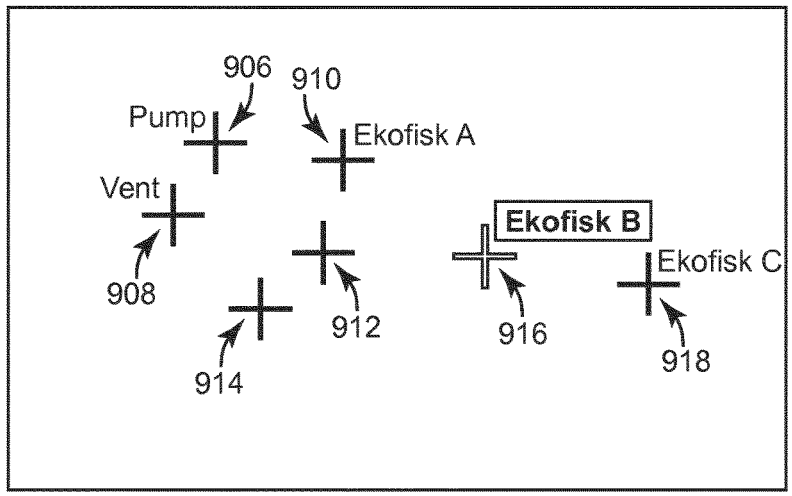
FIG. 9 is an illustration of an image generated from the image data illustrated in FIG. 8 identifying locations of the oil rigs according to exemplary aspects of the inventive concepts disclosed herein.

With reference to FIG. 8, a representation 800 of radar data (e.g., as image data) associated with the radar data storage unit 128 includes a set of blobs 804 associated with oil rigs or platforms. With reference to FIG. 9, the radar data associated with representation 800 is processed to determine locations 902, 904, 906 908, 910, 912, and 194. The platforms can be identified by their relative locations as compared to a database. The data is processed using centroiding to determine the location of each platform. The processing can include skeletonization and use of a Hough transform. The target platform 916 can be identified with an outline graphic in some embodiments.

Figure 10:
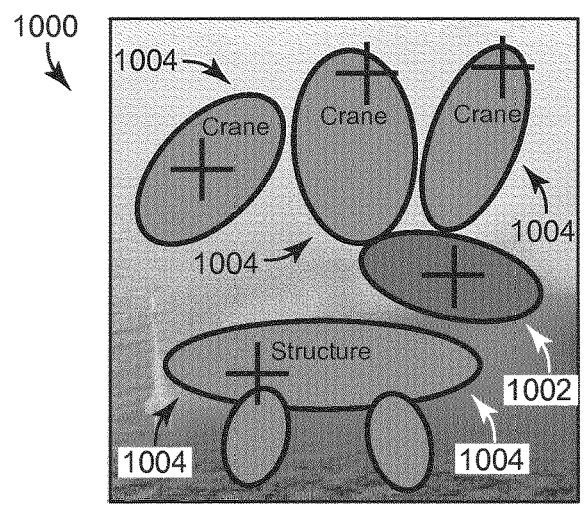
FIG. 10 is an illustration of an image generated from radar data in an environment including an oil platform with a helipad using the display system illustrated in FIG. 2 according to exemplary aspects of the inventive concepts disclosed herein

With reference to FIG. 10, the display system 10 can be used to locate a helipad 1002 on an oil platform using image data 1000. The oil platform includes structures such as cranes, buildings etc. associated with blobs 1004. Centroiding of the blobs 1004 enables the helipad 1002 location to be confirmed. The height of the centroids and expected relative locations can be used to identify the helipad 1002. Approaches to helipads are discussed in U.S. patent application Ser. No. 15/222,923 incorporated herein by reference.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An apparatus for use with a weather aircraft radar system having a radar antenna, the apparatus comprising:
    processing electronics configured to cause the radar antenna to emit radar pulses having a pulse width less than 6 microseconds and configured to receive radar data associated with signals associated with the radar antenna, wherein the radar data is processed to identify a plurality of centroids associated with indications of a plurality of runway lights or infrastructure in the radar data, wherein (1) a best fit analysis of the centroids and (2) a detection of a periodic pattern of the plurality of runway lights or infrastructure is used to identify a runway centerline;
    wherein the detection of the periodic pattern of the plurality of runway lights is performed using a fixed spatial frequency of at least one of the group selected from ALS lights and runway centerline lights.

2. The apparatus of claim 1, wherein the processing electronics utilize statistical regression to identify the runway centerline.

3. The apparatus of claim 2, wherein the radar antenna is a weather radar antenna and the radar data is from a weather radar system without an enhanced lateral resolution capability.

4. The apparatus of claim 1, further comprising a display configured to provide an image, the image including a representation of the runway centerline detected by the processing electronics.

5. The apparatus of claim 4, wherein the image is conformally provided onto a combiner of a head up display system.

6. The apparatus of claim 1, wherein the runway lights comprise runway centerline lights, approach lighting system lights, or stanchions.

7. The apparatus of claim 1, wherein the centroids comprise at least four centroids.

8. The apparatus of claim 7, wherein the centroids comprise at least seven centroids.

9. The apparatus of claim 8, wherein the runway lights are approach lighting system lights spaced at a distance of 200 feet or 100 feet.

10. A method of using radar return data from a weather radar system on an aircraft, the method comprising:
   receiving the radar return data using the radar system;
   using an electronic processor, processing image data associated with the radar return data to identify a plurality of centroids associated with indications of a plurality of runway lights;
   identifying a runway centerline by (1) a best fit analysis of the centroids and (2) a detection of a periodic pattern of the plurality of runway lights,
   wherein the detection of the periodic pattern of the plurality of runway lights is performed using a filter selected from the group consisting of a Fourier transform, a discrete cosine transform (DCT), a spatial frequency, or pattern matching; and
   providing image or symbolic data including a representation of the runway centerline on an aircraft electronic display.

11. The method of claim 10, further comprising:
   correlating the runway centerline with a synthetic vision system centerline.

12. The method of claim 11, further comprising:
   using the correlation to enable a lower minima approach.

13. The method of claim 11, further comprising:
   using the correlation to indicate an error.

14. The method of claim 13, further comprising:
   displaying an image associated with the image data or the symbolic data on an electronic display.

15. The method of claim 14, wherein the electronic display is a head up display and the identifying step is performed in a head up display computer, the weather radar system, a synthetic vision system, or a display computer.

16. The method of claim 12, wherein the identifying uses a filter to identify a pattern associated with the runway lights and the pattern comprises the groups of returns.

17. The method of claim 16, further comprising:
   using statistical regression or a Hough transform to detect the runway centerline in the image data.

18. A weather radar system, the weather radar system comprising:
   means for receiving weather radar data; and
   means for identifying runway lights or runway light infrastructure from the weather radar data and providing a runway centerline depiction on an electronic display using a plurality of centroids associated with indications of the runway lights or the infrastructure in the weather radar data, wherein the runway centerline depiction is performed using (1) a best fit analysis of the centroids and (2) a detection of a periodic pattern of the plurality of runway lights,
   wherein the detection of the periodic pattern of the plurality of runway lights is performed using a fixed spatial frequency of at least one of the group selected from ALS lights and runway centerline lights.

19. The weather radar system claim 18, wherein the weather radar data is generated without using beam sharpening.

20. The weather radar system of claim 18, wherein the centroids are in a pattern in the weather radar data and a Hough transform using the centroids is used to provide the runway centerline depiction.

* * * * *